(12) United States Patent
Taratuta

(10) Patent No.: US 10,624,474 B2
(45) Date of Patent: Apr. 21, 2020

(54) WALL MOUNTING APPARATUS AND METHODS

(71) Applicant: Leonid Taratuta, Staten Island, NY (US)

(72) Inventor: Leonid Taratuta, Staten Island, NY (US)

( * ) Notice: Subject to any disclaimer, the term of this patent is extended or adjusted under 35 U.S.C. 154(b) by 28 days.

(21) Appl. No.: 15/971,013

(22) Filed: May 4, 2018

(65) Prior Publication Data

US 2018/0317672 A1    Nov. 8, 2018

Related U.S. Application Data

(60) Provisional application No. 62/502,611, filed on May 6, 2017.

(51) Int. Cl.

| A47G 1/17 | (2006.01) |
|---|---|
| F16B 1/00 | (2006.01) |
| F16B 11/00 | (2006.01) |
| A47G 25/06 | (2006.01) |
| F16B 15/00 | (2006.01) |
| A47G 1/22 | (2006.01) |
| A47G 1/20 | (2006.01) |

(52) U.S. Cl.
CPC ............... *A47G 1/17* (2013.01); *A47G 1/175* (2013.01); *A47G 1/20* (2013.01); *A47G 1/22* (2013.01); *A47G 25/0635* (2013.01); *F16B 1/00* (2013.01); *F16B 11/006* (2013.01); *F16B 15/00* (2013.01); *F16B 2001/0028* (2013.01)

(58) Field of Classification Search
CPC . A47G 1/17; A47G 1/175; A47G 1/20; A47G 1/22; A47G 25/0635; F16B 1/00; F16B 11/006; F16B 15/00; F16B 2001/0028
See application file for complete search history.

(56) References Cited

U.S. PATENT DOCUMENTS

| 1,945,897 | A | 2/1934 | Haukedahl |
|---|---|---|---|
| 4,619,430 | A | 10/1986 | Hogg |
| 4,728,237 | A | 3/1988 | Lorincz et al. |
| 4,871,140 | A | 10/1989 | Hoskinson et al. |
| 5,029,788 | A | 7/1991 | Hoskinson |
| 5,180,135 | A | 1/1993 | Hindall |
| 5,314,160 | A | 5/1994 | Larsen |
| 5,867,917 | A | 2/1999 | Karon |
| 6,186,466 | B1 * | 2/2001 | Baird ............... A47G 1/168 248/467 |

(Continued)

*Primary Examiner* — Anita M King
(74) *Attorney, Agent, or Firm* — Walter J. Tencza, Jr.

(57) ABSTRACT

An apparatus including a first block; a first strip having a first side with a first attachment device and an opposing second side with an adhesive; and a first pin having a head portion and an elongated portion which is connected at a first end to the head portion, which projects from the head portion of the first pin, and has an opposing second end at which there is a point. The head portion of the first pin is configured to be attached to the first block in a first state, and the first side of the first strip is attached to the first block by the first attachment device and the elongated portion of the first pin projects out through a first opening in the first strip. The pin is inserted into the wall and the first strip is attached to the wall by the attachment device.

31 Claims, 25 Drawing Sheets

(56) References Cited

U.S. PATENT DOCUMENTS

| | | | | |
|---|---|---|---|---|
| 6,471,169 | B1* | 10/2002 | Maloney | A47G 1/17 248/205.3 |
| 7,284,734 | B2 | 10/2007 | Hamerski | |
| 7,290,743 | B2 | 11/2007 | Nowack | |
| 8,632,044 | B2* | 1/2014 | Cave | A47G 1/168 248/205.3 |
| 10,259,194 | B2* | 4/2019 | Cowman-Eggert | B32B 7/06 |
| 2004/0084597 | A1 | 5/2004 | Hamerski | |
| 2005/0006552 | A1* | 1/2005 | Giles | A47G 1/168 248/467 |
| 2006/0099370 | A1 | 5/2006 | Glass | |
| 2011/0268535 | A1 | 11/2011 | Reeder | |
| 2012/0005983 | A1* | 1/2012 | Stephan | F16B 43/001 52/741.4 |
| 2012/0308763 | A1* | 12/2012 | Chen | B32B 3/06 428/78 |
| 2015/0132528 | A1* | 5/2015 | Pirayesh | B44C 5/02 428/76 |

* cited by examiner

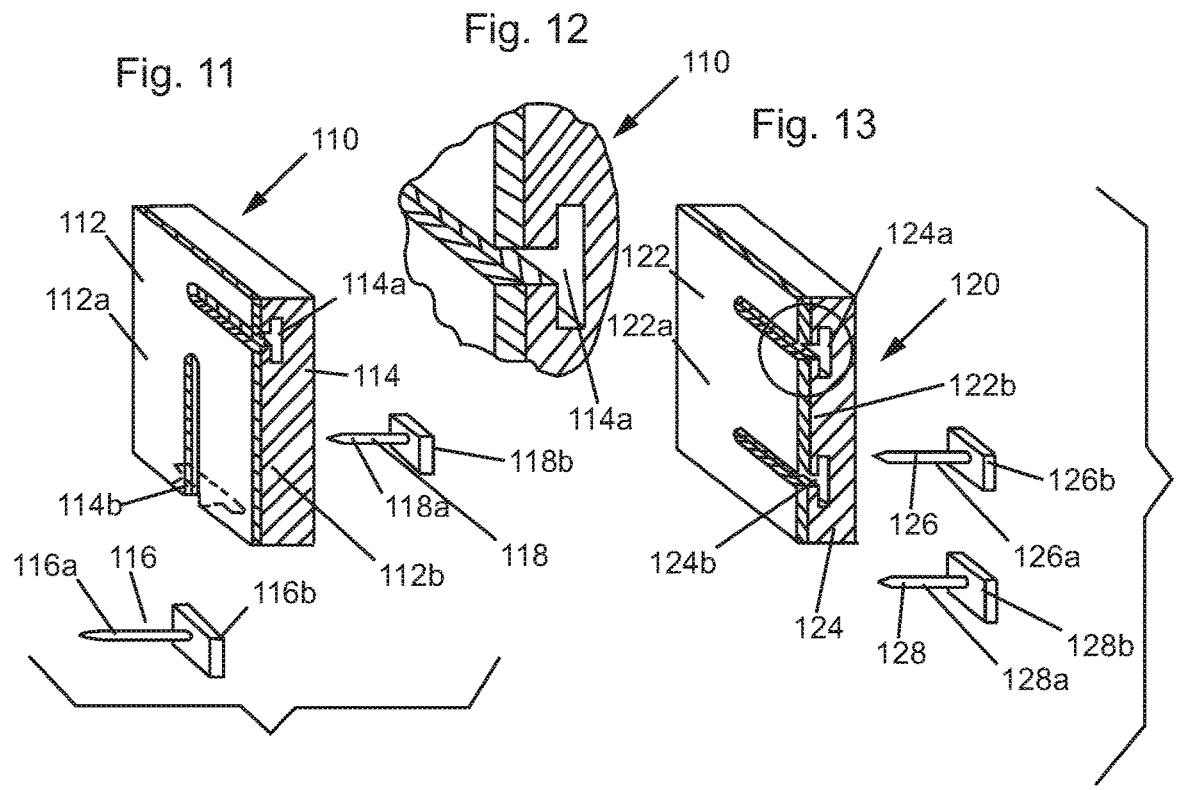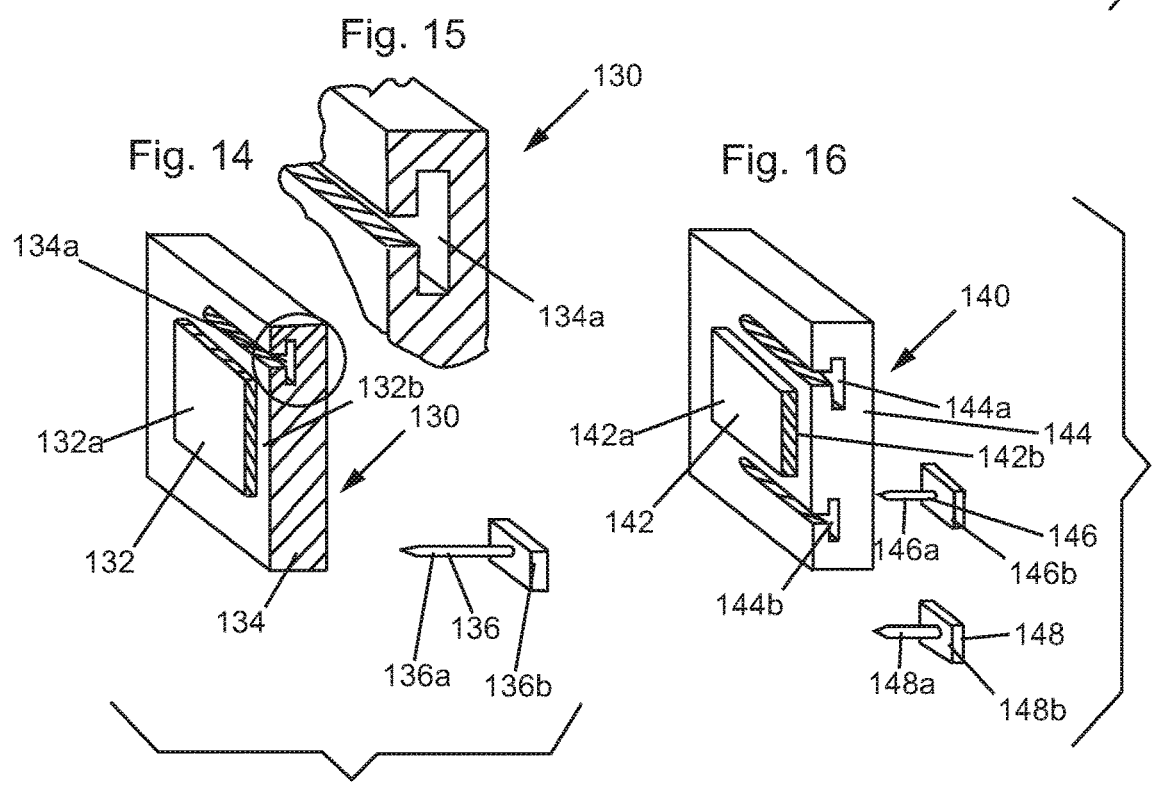

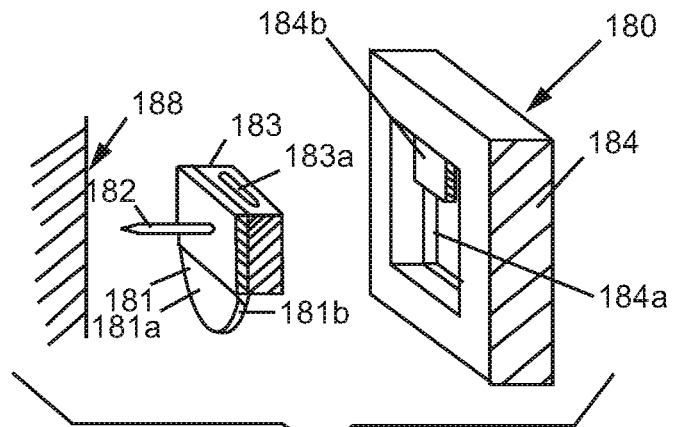
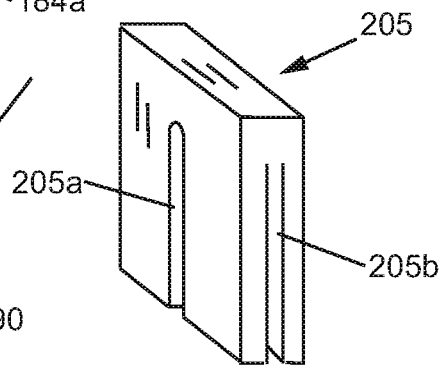
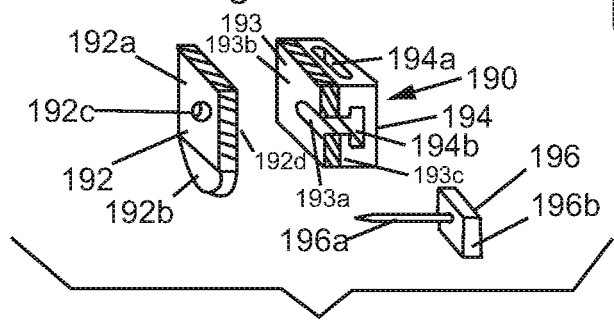
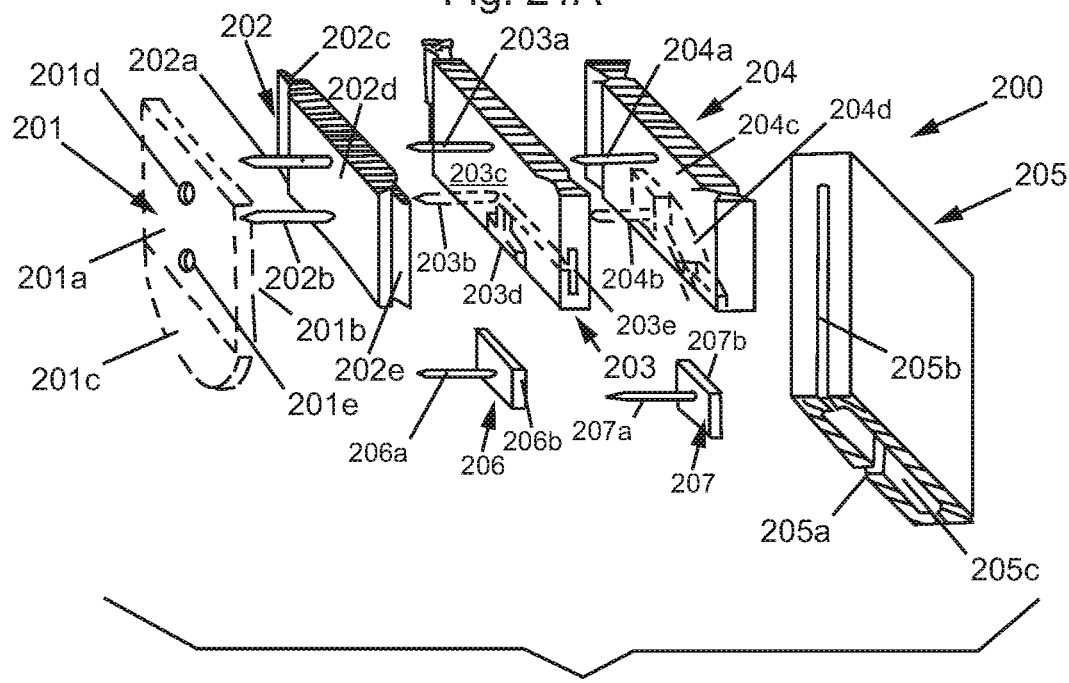

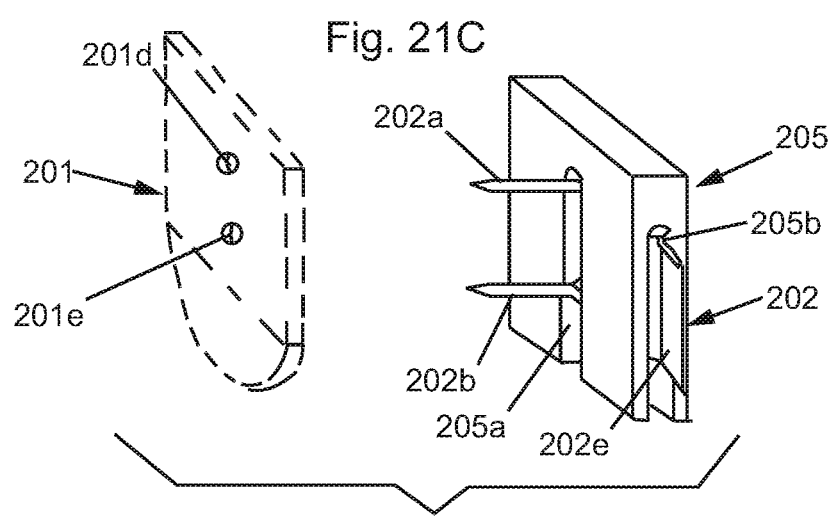

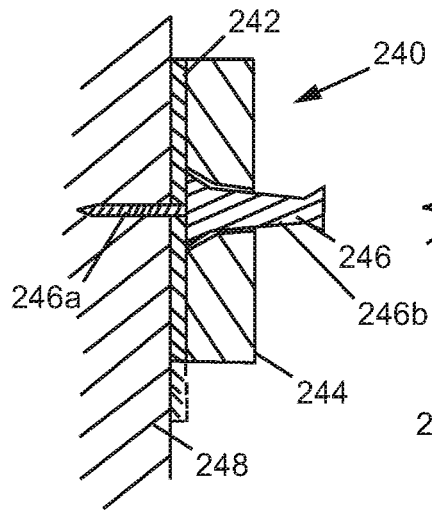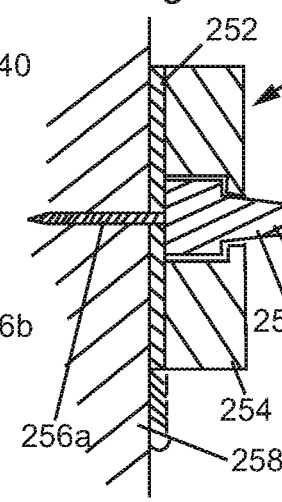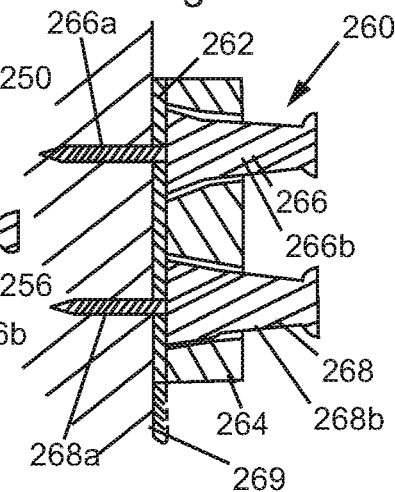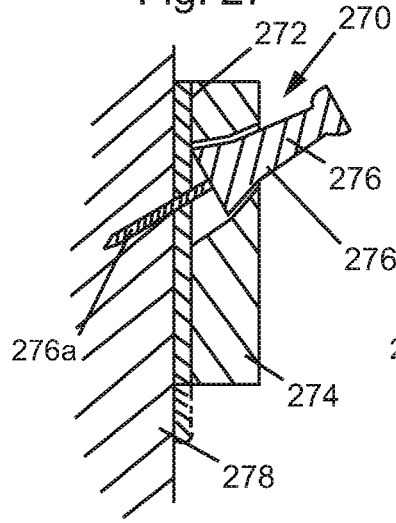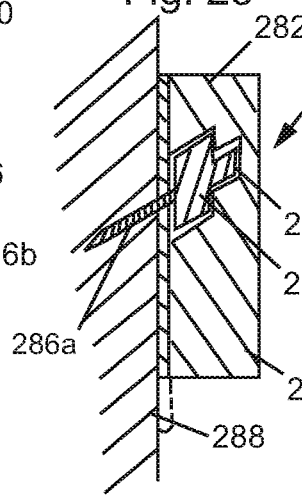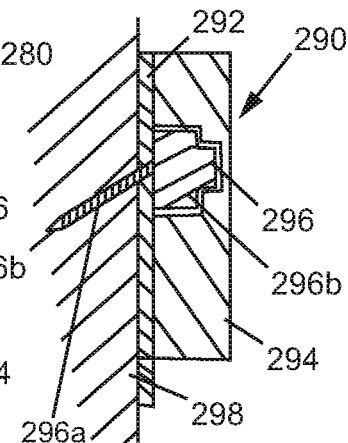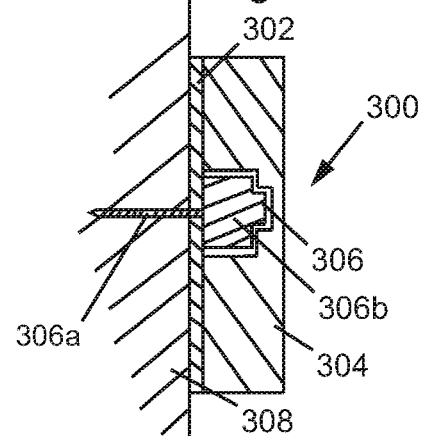

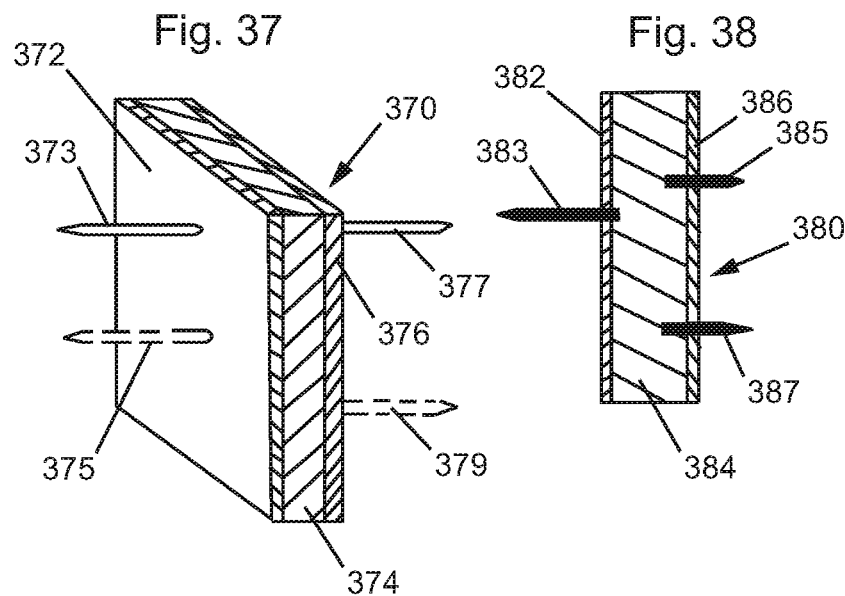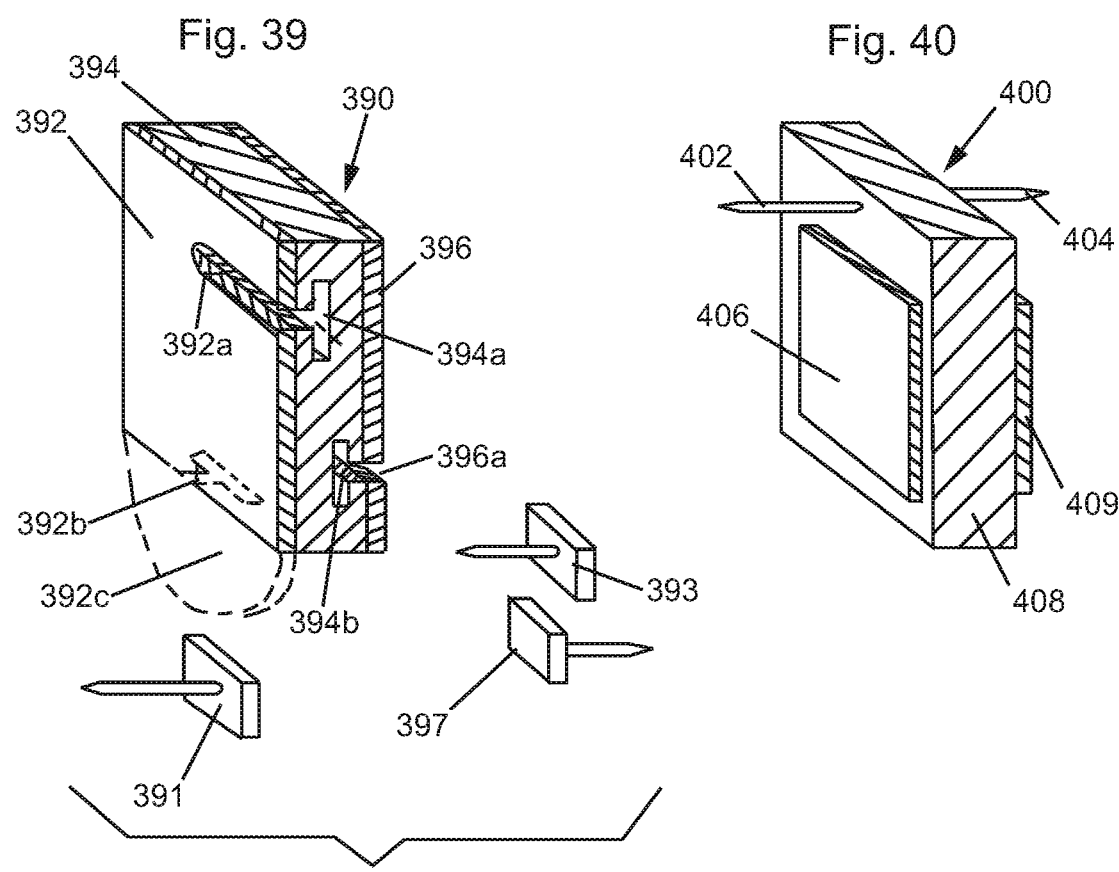

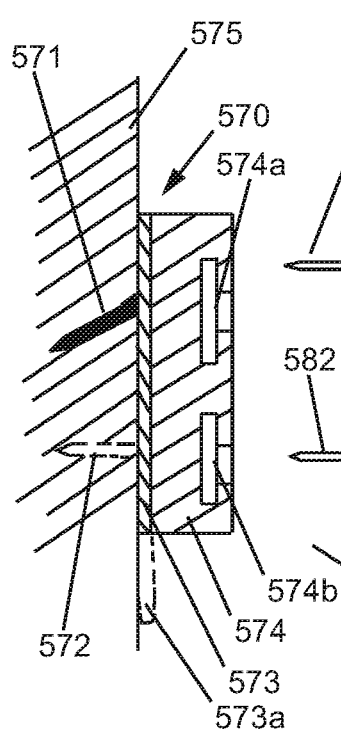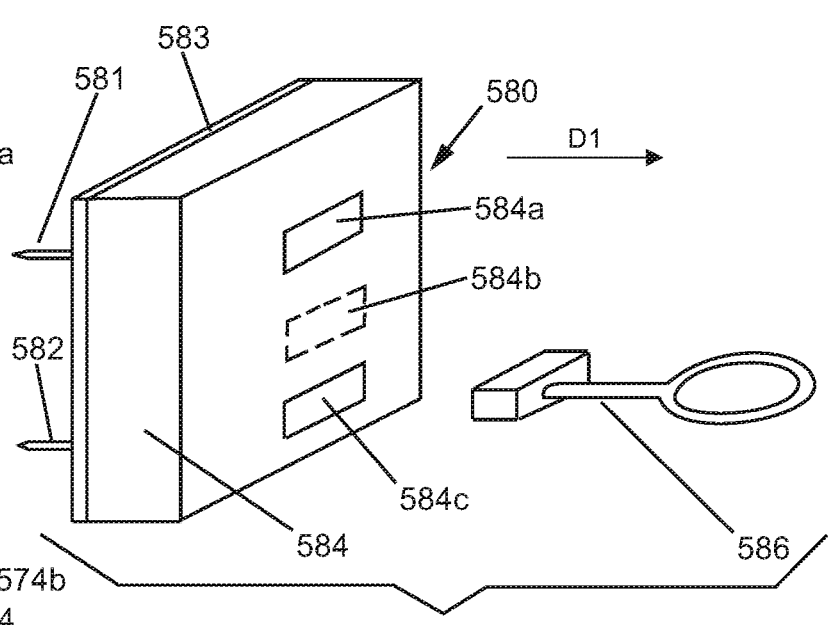

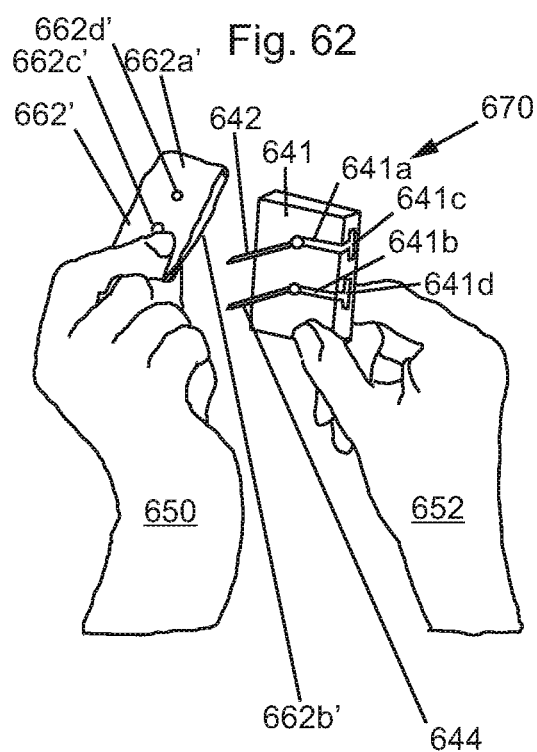
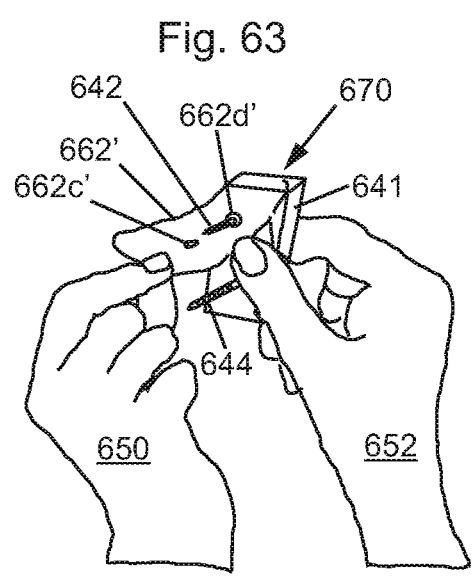

WALL MOUNTING APPARATUS AND METHODS

CROSS REFERENCE TO RELATED APPLICATION(S)

The present application claims the priority of U.S. Provisional Patent application Ser. No. 62/502,611, titled "Combined fastening mechanism for connection of two or more plains or surfaces using adhesive bond based forces films or tapes or self adhesive VELCRO (trademarked), hooks and/or loops type straps and push-pin like thumb tack apparatuses", filed on May 6, 2017, inventor and applicant Leonid Taratuta.

FIELD OF THE INVENTION

This invention relates to improved methods and apparatus concerning devices for mounting something on a wall or any flat surface.

BACKGROUND OF THE INVENTION

Typically in the prior art various wall mounting devices are known, such as devices which use pins only, and devices which use tape only.

SUMMARY OF THE INVENTION

In at least one embodiment, an apparatus is provided comprising a first block; a first strip having a first side with a first attachment device and an opposing second side with an adhesive; and a first pin having a head portion and an elongated portion which is connected at a first end to the head portion, projects from the head portion of the first pin, and has an opposing second end at which there is a point; and wherein the head portion of the first pin is configured to be attached to the first block in a first state, so that the elongated portion of the first pin projects from the first block in the first state; and wherein the first side of the first strip is configured to be attached to the first block by the first attachment device and the elongated portion of the first pin projects out through a first opening in the first strip, when the first strip is attached to the first block and the first pin is attached to the first block.

In at least one embodiment, the first block includes a first slot, into which the head portion of the first pin is configured to be inserted in order to attach the head portion of the first pin to the first block.

In at least one embodiment, the elongated portion of the first pin projects out at a ninety degree angle with respect to the first block in the first state.

The apparatus may further include a second pin having a head portion and an elongated portion which is connected at a first end to the head portion, projects from the head portion of the second pin, and has an opposing second end at which there is a point; and wherein the head portion of the second pin is configured to be attached to the first block in the first state, so that the elongated portion of the second pin projects from the first block in the first state; and wherein the first side of the first strip is configured to be attached by the first attachment device to the first block and the elongated portion of the second pin projects out through a second opening in the first strip, when the first strip is attached to the first block and the second pin is attached to the first block.

The elongated portion of the first pin may project out at a ninety degree angle with respect to the first block in the first state; and the elongated portion of the second pin may project out at a ninety degree angle with respect to the first block in the first state.

The first side of the first strip may be approximately equal to a side of the first block to which the first side of the first strip is configured to be attached The first side of the first strip may be substantially larger than a side of the first block to which the first side of the first strip is configured to be attached, so that part of the first side of the first strip extends beyond the first block, while substantially an entire side of the first block is covered with part of the first side of the first strip.

The first block may include a first slot, into which the head portion of the first pin is configured to be inserted in order to attach the head portion of the first pin to the first block; and the first block may include a second slot, into which the head portion of the second pin is configured to be inserted in order to attach the head portion of the second pin to the first block. The first slot may be substantially perpendicular to the second slot.

The apparatus may further include a second block, wherein the first block has a first slot; and wherein the second block has a protruding portion which is configured to be inserted into the first slot of the first block to attach the second block onto the first block.

The first attachment device for attaching the first strip may be an adhesive and/or may be comprised of hooks or loops such as VELCRO (trademarked) hooks and/or loops.

In at least one embodiment a method is provided which may include attaching an apparatus as previously described to a wall. The method of claim may further include detaching the apparatus from the wall.

BRIEF DESCRIPTION OF THE DRAWINGS

FIG. 11 shows a front, right, and top of an eleventh apparatus in accordance with an embodiment of the present invention;

FIG. 12 shows a close up view of part of the eleventh apparatus of FIG. 11;

FIG. 13 shows a front, right and top perspective view of a twelfth apparatus in accordance with an embodiment of the present invention;

FIG. 14 shows a front, right, and top view of a thirteenth apparatus in accordance with an embodiment of the present invention;

FIG. 15 shows a close up view of part of the thirteenth apparatus of FIG. 14;

FIG. 16 shows a front, right, and top view of a fourteenth apparatus in accordance with an embodiment of the present invention;

FIG. 20A shows a front, right and top perspective view of an eighteenth apparatus in accordance with an embodiment of the present invention;

FIG. 20B shows a front, right and top perspective view of a nineteenth apparatus in accordance with an embodiment of the present invention, at least some of which can be used with at least some of the eighteenth apparatus of FIG. 20A;

FIG. 21A a front, right and top perspective view of a twentieth apparatus in accordance with an embodiment of the present invention, next to a wall, except for a rear, right, and bottom view of one component;

FIG. 21B shows a front, right, and top perspective view of a component of the twentieth apparatus of FIG. 21A;

FIG. 21C shows a front, right, and top perspective view of parts of the twentieth apparatus of FIG. 21A;

FIG. 24 shows a side cross sectional view of a twenty-third apparatus in accordance with an embodiment of the present invention, attached to a wall;

FIG. 25 shows a side cross sectional view of a twenty-fourth apparatus in accordance with an embodiment of the present invention, attached to a wall;

FIG. 26 shows a side cross sectional view of a twenty-fifth apparatus in accordance with an embodiment of the present invention, attached to a wall;

FIG. 27 shows a side cross sectional view of a twenty-sixth apparatus in accordance with an embodiment of the present invention, attached to a wall;

FIG. 28 shows a side cross sectional view of another apparatus in accordance with an embodiment of the present invention, attached to a wall;

FIG. 29 shows a side cross sectional view of a twenty-seventh apparatus in accordance with an embodiment of the present invention, attached to a wall;

FIG. 30 shows a side cross sectional view of a twenty-eighth apparatus in accordance with an embodiment of the present invention, attached to a wall;

FIG. 37 shows a front, right and top perspective view of a thirty-fourth apparatus in accordance with an embodiment of the present invention;

FIG. 38 shows a front, right and top perspective view of a thirty-fifth apparatus in accordance with an embodiment of the present invention;

FIG. 39 shows a front, right and top perspective view of a thirty-sixth apparatus in accordance with an embodiment of the present invention;

FIG. 40 shows a front, right and top perspective view of a thirty-seventh apparatus in accordance with an embodiment of the present invention;

FIG. 53 shows a side cross sectional view of a forty-ninth apparatus in accordance with an embodiment of the present invention;

FIG. 54 shows a front, right and top perspective view of a fiftieth apparatus in accordance with an embodiment of the present invention;

FIG. 62 shows a front, right and top perspective view of a combination of the fifty-sixth apparatus, a further pin, and part of the fifty-seventh apparatus, in a first state, in accordance with an embodiment of the present invention, with the pair of hands shown;

FIG. 63 shows a front, right and top perspective view of a combination fifty-eighth apparatus of the fifty-sixth apparatus, the further pin, and part of the fifty-seventh apparatus, in a second state, in accordance with an embodiment of the present invention, with the pair of hands shown;

DETAILED DESCRIPTION OF THE DRAWINGS

Figure 1:
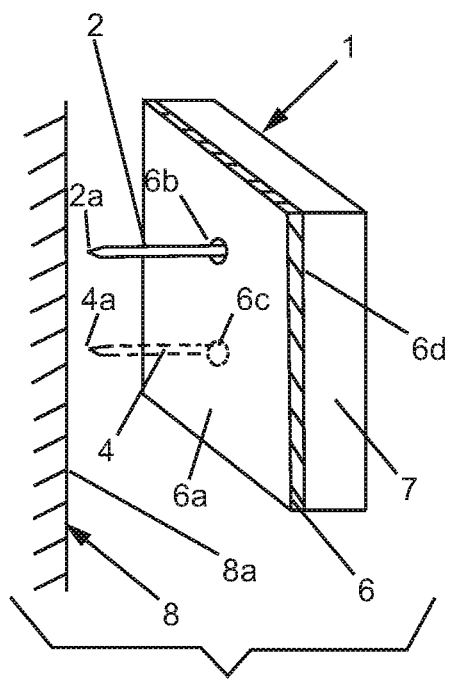
FIG. 1 shows a front, right and top perspective view of a first apparatus in accordance with an embodiment of the present invention next to a wall.

FIG. 1 shows a front, right and top perspective view of an apparatus 1 in accordance with an embodiment of the present invention next to a wall 8. The apparatus 1 includes pins 2 and 4 which protrude outwards at approximately a ninety degree angle with respect to solid rectangular block and from strip or plate 6. Strip 6 may have an adhesive surface 6a, opposite side adhesive surface 6d, and openings 6b and 6c through which pins 2 and 4 protrude. The pins 2 and 4 may have points 2a and 4a, which can be inserted into wall 8 to attach block 7, strip or plate 6, and pins 2 and 4 to the surface 8a of wall 8 along with the use of adhesive 6a, which helps the block 7 to remain attached to the surface 8a of wall 8.

In some embodiments, the block 7 can be or can be replaced by a hook and/or other type of support. The block 7 is shown as rectangular but may be different shapes or materials.

Figure 2:
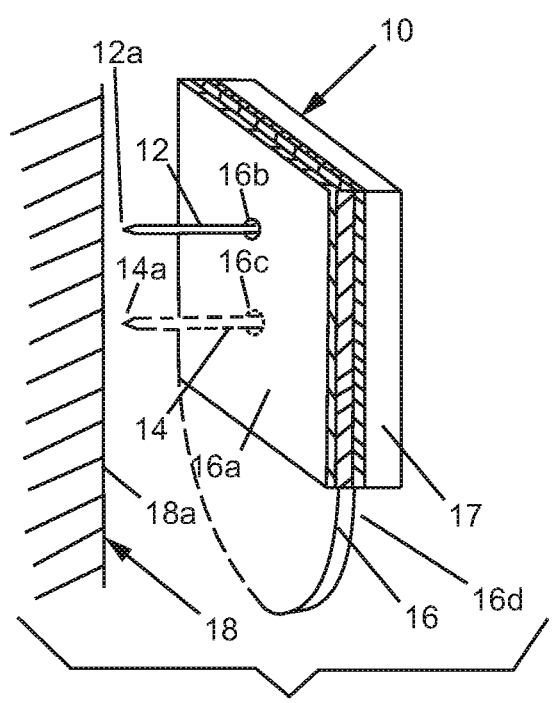
FIG. 2 shows a front, right and top perspective view of a second apparatus in accordance with an embodiment of the present invention next to a wall.

FIG. 2 shows a front, right and top perspective view of an apparatus 10 in accordance with an embodiment of the present invention next to a wall 18. The apparatus 10 includes pins 12 and 14 which protrude outwards at approximately a ninety degree angle with respect to solid rectangular block 17, and from strip or plate 16. Strip 16 may have an adhesive surface 16a, opposite side adhesive surface 16d, and openings 16b and 16c through which pins 12 and 14 protrude. The pins 12 and 14 may have points 12a and 14a, which can be inserted into wall 18 to attach block 17, strip or plate 16, and pins 12 and 14 to the surface 18a of wall 18 along with the use of adhesive 16a, which helps the block 17 to remain attached to the surface 18a of wall 18.

The apparatus 1 of FIG. 1 has an adhesive two-sided strip/film 6 permanently attached to block 7 and can be attached to wall 8 respectfully. The apparatus 10 of FIG. 2 has an adhesive two-sided strip/film 16 that can be re-attached from the wall 18 by pulling down that elongated part of the strip 16, that protrudes beyond block 17.

Figure 3:
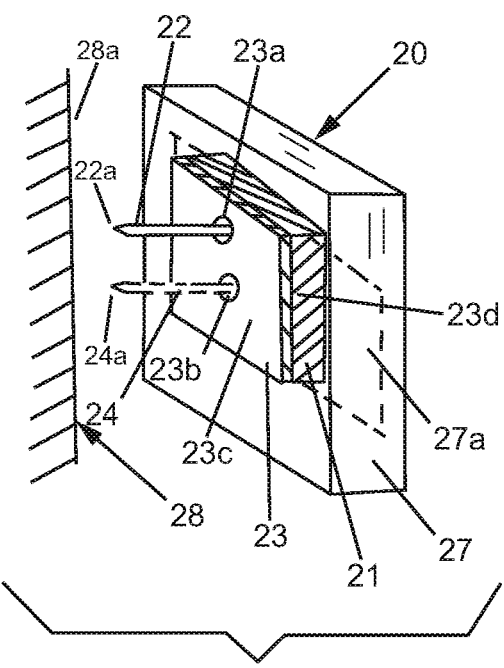
FIG. 3 shows a front, right and top perspective view of a third apparatus in accordance with an embodiment of the present invention next to a wall.

FIG. 3 shows a front, right and top perspective view of an apparatus 20 in accordance with an embodiment of the present invention next to a wall 28. The apparatus 20 includes rectangular block 27 having an indentation 27a in which a block 21 may be inserted. The apparatus 20 includes the rectangular block 21 which can move within the indentation 27a. The rectangular block 21 has openings aligned with openings 23a and 23b of strip or plate 23, through which pins 22 and 24 protrude outwards at approximately a ninety degree angle with respect to the solid rectangular block 27, from block 21, and from strip or plate 23. Strip 23 may have an adhesive surface 23c, opposite side adhesive surface 23d, and openings 23a and 23b through which pins 22 and 24 protrude. The pins 22 and 24 may have points 22a and 24a, which can be inserted into the wall 28 to attach block 27, strip or plate 23, block 21, and pins 22 and 24 to the surface 28a of wall 28 along with the use of adhesive 23c, which helps the block 27, block 21, and strip 23 to remain attached to the surface 28a of wall 28.

The block 21 of the apparatus 20 can be attached permanently to the wall 28 by use of pins 22 and 24 and adhesive 23c. Block 21 may be attached to the wall 28 and then block 27 may hang on block 21, i.e. block 21 is inserted into opening 27a of block 27.

Figures 4A, 4B:
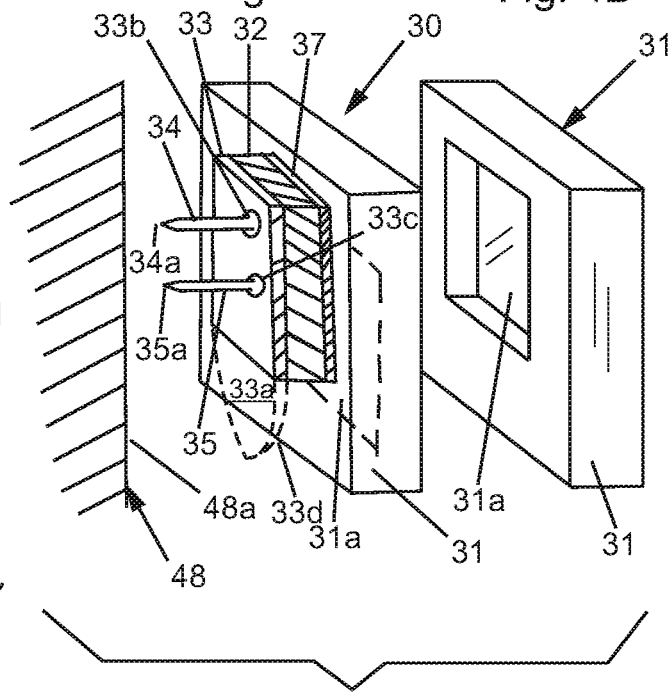
FIG. 4A shows a front, right and top perspective view of a fourth apparatus in accordance with an embodiment of the present invention next to a wall.
FIG. 4B shows a front, right and top perspective view of block having an opening which is part of the fourth apparatus of FIG. 4A.

FIG. 4A shows a front, right and top perspective view of an apparatus 30 next to a wall 48. FIG. 4B shows a front, right and top perspective view of block 31 having an indentation 31a which is part of the apparatus 30.

The block 31 may be a rectangular solid block except for a rectangular indentation 31a. The apparatus 30 may include the solid rectangular block 31, and a solid rectangular block 32 having a strip or plate 33 attached thereto. The strip or plate 33 may have an adhesive surface 33a, opposite side adhesive surface 33d, and openings 33b and 33c through which pins 34 and 35 protrude at approximately a ninety degree angle with respect to block 31. The pins 34 and 35 may have points 34a and 35a, which can be inserted into the wall 48 to attach block 31, block 32, and pins 34 and 35 to the surface 48a of wall 48 along with the use of adhesive 33a, which helps the block 31, block 32, and strip 33 to remain attached to the surface 48a of wall 48. The apparatus 30 includes another strip 37, which may have adhesive on both a side attached to the block 32 and on the opposite side similar to strip or plate 33.

The apparatus 30 of FIG. 4 is similar to the apparatus 20 of FIG. 3, but the apparatus of FIG. 4 has a pull able part of plate 33 which extends below block 32, which is a pull down strip used to detach the block 32 from the wall 48.

Figure 5:
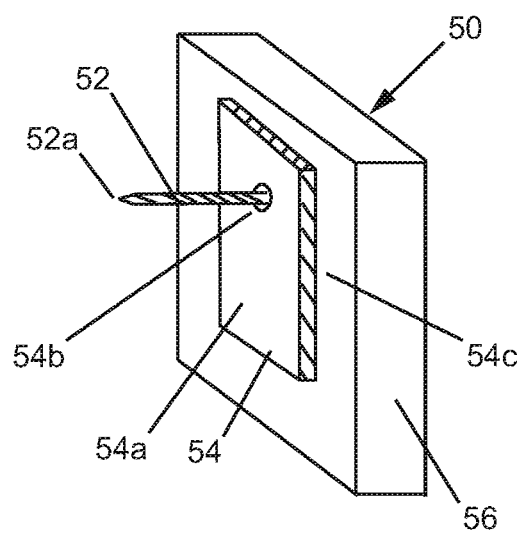
FIG. 5 shows a front, right and top perspective view of a fifth apparatus in accordance with an embodiment of the present invention.

FIG. 5 shows a front, right and top perspective view of an apparatus 50 in accordance with an embodiment of the present invention. The apparatus 50 includes a pin 52 having a point 52a, a strip 54 having an adhesive surface 54a, opposite side adhesive surface 54c, and a block 56. Adhesive surface 54c is permanently attached to the block 56, in at least one embodiment. The apparatus 50 can be mounted to a wall by inserting point 52a of pin 52 into the wall until adhesive surface 54a adheres to the wall. The pin 52 protrudes out through opening 54b of the strip 54 and is fixed at approximately a ninety degree angle to the block 56.

Figure 6:
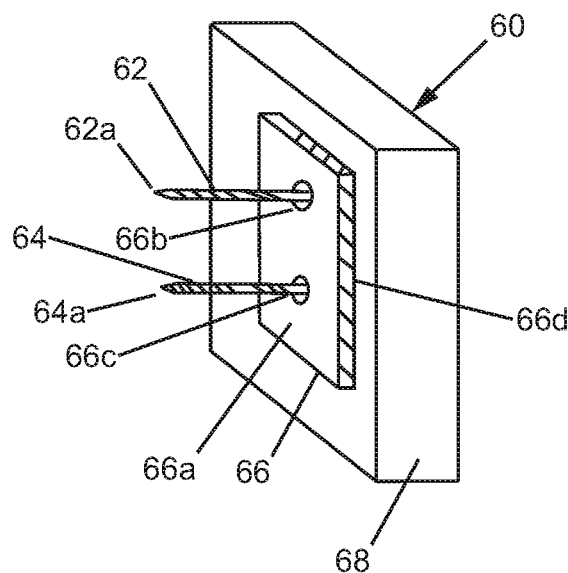
FIG. 6 shows a front, right and top perspective view of a sixth apparatus in accordance with an embodiment of the present invention.

FIG. 6 shows a front, right and top perspective view of an apparatus 60 in accordance with an embodiment of the present invention. The apparatus 60 includes pins 62 and 64 having points 62a and 64a, a strip 66 having an adhesive surface 66a, opposite side adhesive surface 66d, and a block 68. Adhesive surface 66d is permanently attached to the block 68, in at least one embodiment. The apparatus 60 can be mounted to a wall by inserting point 62a of pin 62 and point 64a of pin 64 into a wall until adhesive surface 66a adheres to the wall. The pins 62 and 64 protrude out through openings 66b and 66c of the strip 66 and are fixed at approximately a ninety degree angle to the block 68. The block 68 may be made of a rigid material, such as a wood, metal, or hard plastic. In some embodiments, the block 68 can be or can be replaced by a hook and/or other type of support. The block 68 is shown as rectangular but may be different shapes or materials.

Figure 7:
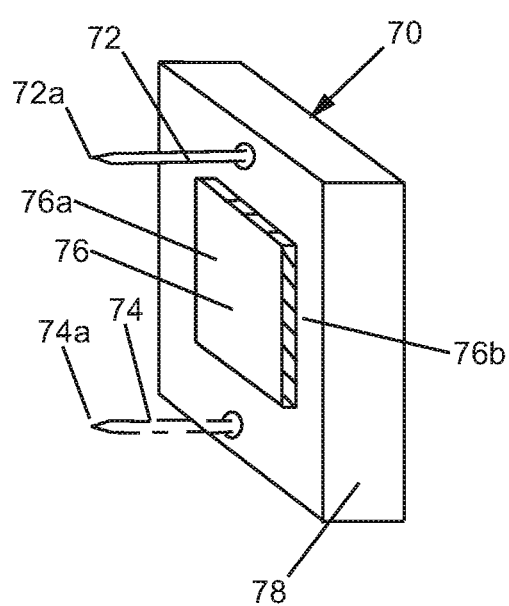
FIG. 7 shows a front, right and top perspective view of a seventh apparatus in accordance with an embodiment of the present invention.

FIG. 7 shows a front, right and top perspective view of an apparatus 70 in accordance with an embodiment of the present invention. The apparatus 70 includes pins 72 and 74 having points 72a and 74a, a strip 76 having an adhesive surface 76a, opposite side adhesive surface 76b, and a block 78. The apparatus 70 can be mounted to a wall by inserting point 72a of pin 72 and point 74a of pin 74 into a wall until adhesive surface 76a adheres to the wall. The pins 72 and 74 are fixed at approximately a ninety degree angle to the block 78. The block 78 may be made of a rigid material, such as a wood, metal, or hard plastic. In some embodiments, the block 78 can be or can be replaced by a hook and/or other type of support. The block 78 is shown as rectangular but may be different shapes or materials.

Figure 8:
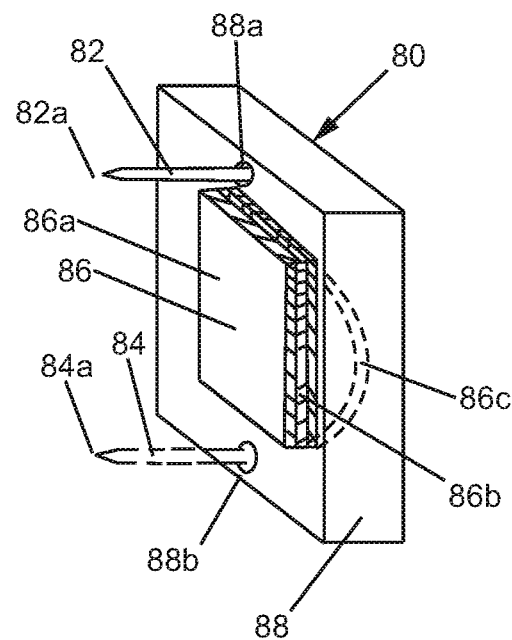
FIG. 8 shows a front, right and top perspective view of an eighth apparatus in accordance with an embodiment of the present invention.

FIG. 8 shows a front, right and top perspective view of an apparatus 80 in accordance with an embodiment of the present invention. The apparatus 80 includes pins 82 and 84 having points 82a and 84a, a strip 86 having an adhesive surface 86a, opposite side adhesive surface 86b, and a block 88. The apparatus 80 can be mounted to a wall by inserting point 82a of pin 82 and point 84a of pin 84 into a wall until adhesive surface 86a adheres to the wall. The pins 82 and 84 are fixed at approximately a ninety degree angle to the block 88. The block 88 may be made of a rigid material, such as a wood, metal, or hard plastic. In some embodiments, the block 88 can be or can be replaced by a hook and/or other type of support. The block 88 is shown as rectangular but may be different shapes or materials. The block 88 has openings 88a and 88b.

The strip 86 has a portion 86c, shown by dashed lines, which extends beyond the block 88 and which is pull able to release or remove the apparatus 80 from a wall.

Figure 9:
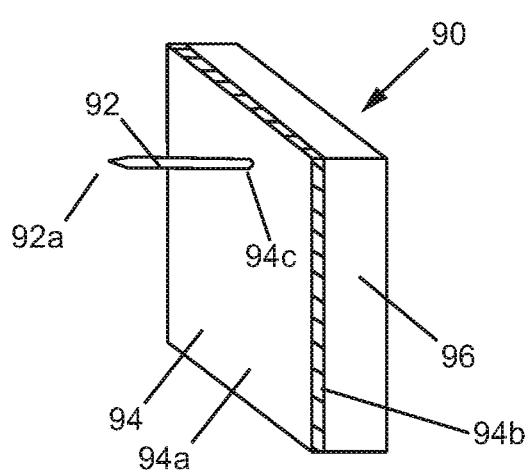
FIG. 9 shows a front, right and top perspective view of a ninth apparatus in accordance with an embodiment of the present invention.

FIG. 9 shows a front, right and top perspective view of an apparatus 90 in accordance with an embodiment of the present invention. The apparatus 90 includes pin 92 which protrudes outwards at approximately a ninety degree angle with respect to solid rectangular block 96 and from strip or plate 94. Strip 94 may have an adhesive surface 94a, opposite side adhesive surface 94b, and opening 94c through which pin 92 protrudes. The pin 92 may have point 92a, which can be inserted into a wall to attach block 96, strip or plate 94, and pin 92 to the surface of a wall along with the use of adhesive 94a, which helps the block 96 to remain attached to the surface of a wall. In some embodiments, the block 96 can be or can be replaced by a hook and/or other type of support. The block 96 is shown as rectangular but may be different shapes or materials.

Figure 10:
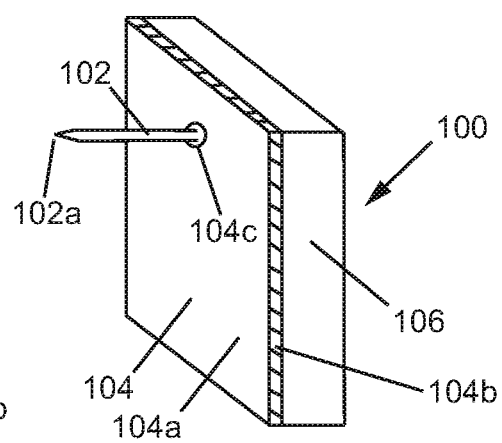
FIG. 10 shows a front, right and top perspective view of a tenth apparatus in accordance with an embodiment of the present invention.

FIG. 10 shows a front, right and top perspective view of an apparatus 100 in accordance with an embodiment of the present invention. The apparatus 100 includes pin 102 which protrudes outwards at approximately a ninety degree angle with respect to solid rectangular block 106 and from strip or plate 104. Strip 104 may have an adhesive surface 104a, opposite side adhesive surface 104b, and opening 104c through which pin 102 protrudes. The pin 102 may have point 102a, which can be inserted into a wall to attach block 106, strip or plate 104, and pin 102 to the surface of a wall along with the use of adhesive 104a, which helps the block 106 to remain attached to the surface of a wall.

The apparatus 100 in FIG. 10 has pre-punched opening 104c on strip or plate 104 for pin 102, while the apparatus 90 in FIG. 9 doesn't have these combination of features. In some embodiments, the block 106 can be or can be replaced by a hook and/or other type of support. The block 106 is shown as rectangular but may be different shapes or materials.

FIG. 11 shows a front, right and top perspective view of an apparatus 110 in accordance with an embodiment of the present invention. The apparatus 110 includes a strip or plate 112 having an adhesive surface 112a and an opposite adhesive surface 112b, a block 114, having slots 114a and 114b, and pins 116 and 118. The pins 116 and 118 may have body portions 116a and 118a, and cap or head portions 116b and 118b, respectively. The head portion 116b and pin part 116a of the pin 116 can be slid into the slot 114b of the block 114 and the head portion 118b and pin part 118a can be slid into the slot 114a of the block 114 to attach the pins 116 and 118 to the block 114 so that body portions 118a and 116a are at approximately a right angle with respect to block 114 and surface 112a.

The points of pins 116 and 118 can then be inserted into a wall and the adhesive surface 112a can be adhered to the same wall. In some embodiments, the block 114 can be or can be replaced by a hook and/or other type of support. The block 114 is shown as rectangular but may be different shapes or materials.

FIG. 12 shows a closeup view of part of apparatus 110, including part of slot 114a.

FIG. 13 shows a front, right and top perspective view of an apparatus 120 in accordance with an embodiment of the present invention. The apparatus 120 includes a strip or plate 122 having an adhesive surface 122a and an opposite adhesive surface 122b, a block 124, having slots 124a and 124b, and pins 126 and 128. The pins 126 and 128 may have body portions 126a and 128a, and cap or head portions 126b and 128b, respectively. The head portion 126b of the pin 126 and pin part 126a can be slid into the slot 124a of the block 124 and the head portion 128b and pin part 128a can be slid into the slot 124b of the block 124 to attach the pins 126 and 128 to the block 124 so that body portions 128a and 126a are at approximately a right angle with respect to block 124 and surface 122a. The points of pins 126 and 128 can then be inserted into a wall and the adhesive surface 122a can be adhered to the same wall. In some embodiments, the block 124 can be or can be replaced by a hook and/or other type of support. The block 124 is shown as rectangular but may be different shapes or materials.

FIG. 14 shows a front, right and top perspective view of an apparatus 130 in accordance with an embodiment of the present invention. The apparatus 130 includes a strip or plate 132 having an adhesive surface 132a and an opposite adhesive surface 132b, a block 134, having a slot 134a, and pin 136. The pin 136 may have a body portion 136a, and cap or head portion 136b, respectively. The head portion 136b and pin part 136a of the pin 136 can be slid into the slot 134a of the block 134, to attach the pin 136 to the block 134 so that body portion 136a are at approximately a right angle with respect to block 134 and surface 132a. The point of pin 136 can then be inserted into a wall and the adhesive surface 132a can be adhered to the same wall. In some embodiments, the block 134 can be or can be replaced by a hook and/or other type of support. The block 134 is shown as rectangular but may be different shapes or materials.

FIG. 15 shows a closeup view of part of apparatus 130, including part of slot 134a.

FIG. 16 shows a front, right and top perspective view of an apparatus 140 in accordance with an embodiment of the present invention. The apparatus 140 includes a strip or plate 142 having an adhesive surface 142a and an opposite adhesive surface 142b, a block 144, having a slots 144a and 144b, and pins 146 and 148. The pins 146 and 148 may have body portions 146a and 148a, and cap or head portions 146b and 148b, respectively. The head portions 146b (and pin part 146a) and 148b (and pin part 148a) of the pins 146 and 148 can be slid into the slots 144a and 144b of the block 144, to attach the pins 146 and 148 to the block 144 so that body portions 146a and 148a are at approximately a right angle with respect to block 144 and surface 142a. The points of pins 146 and 148 can then be inserted into a wall and the adhesive surface 142a can be adhered to the same wall. In some embodiments, the block 144 can be or can be replaced by a hook and/or other type of support. The block 144 is shown as rectangular but may be different shapes or materials.

Figure 17:
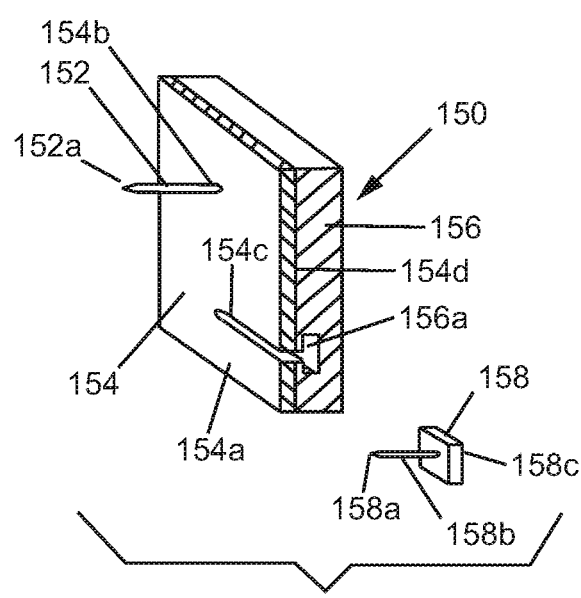
FIG. 17 shows a front, right, and top view of a fifteenth apparatus in accordance with an embodiment of the present invention.

FIG. 17 shows a front, right and top perspective view of an apparatus 150 in accordance with an embodiment of the present invention. The apparatus 150 includes pin 152 which protrudes outwards at approximately a ninety degree angle with respect to solid rectangular block 156 and from strip or plate 154. Strip 154 may have an adhesive surface 154a, opposite side adhesive surface 154d, and a slot 156a through which a cap or head portion 158c and a part of body portion 158b of a pin 158 can be inserted. The pin 158 includes point 158a and body portion 158b in addition to cap or head portion 158c. The strip or plate 154 may include slot 154c (which may also be part of block 156), and through which part of the pin 158 body portion 158b can be inserted. The pin 158 can be inserted, so that body portion 158b protrudes outwards from block 156 at an approximately ninety degree angle similar or identical to pin 152. The pin 152 may protrude out through opening 154b of the plate or strip 154. The pin 158 may be slid along slot or channel 154c so it can be placed at different locations with respect to block 156, when attached to block 156.

The pins 152 and 158, while attached to block 156, at a ninety degree angle, may have points 152a and 158a, respectively, which can simultaneously be inserted into a wall to attach block 156, strip or plate 154, and pins 152 and 158 to the surface of the wall along with the use of adhesive 154a, which helps the block 156 to remain attached to the surface of the wall In some embodiments, the block 156 can be or can be replaced by a hook and/or other type of support. The block 156 is shown as rectangular but may be different shapes or materials.

Figure 18:
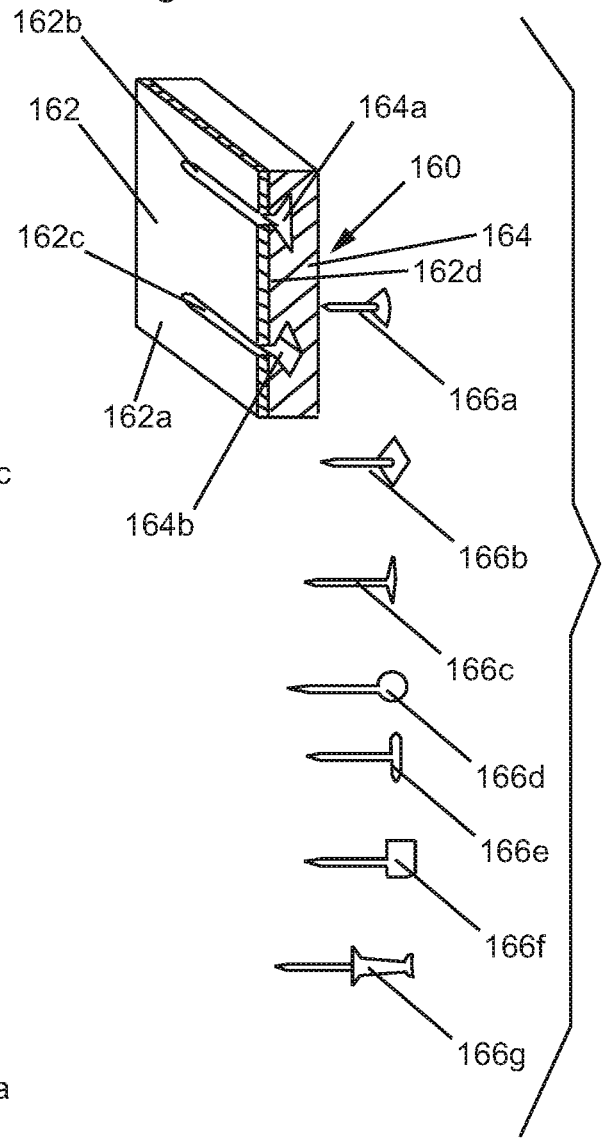
FIG. 18 shows a front, right, and top view of a sixteenth apparatus in accordance with an embodiment of the present invention, along with side views of a plurality of possible pins.

FIG. 18 shows a front, right and top perspective view of an apparatus 160 in accordance with an embodiment of the present invention. The apparatus 160 includes strip or plate 162 having an adhesive surface 162a, opposite side adhesive surface 162d, and slots 162b and 162c through which a pin, such as one of pins 166a, 166b, 166c, 166d, 166e, 166f, and 166g can protrude (typically one pin of pins 166a-g, through each of slots 162b-c).

The block 164 may include slots 164a and 164b. The shape of slots 164a-b, although shown as a particular shape in FIG. 18 may be changed and/or may be matched to any of the head or cap portions of pins 166a-g for a snug fit. The pins 166a-g show few of many possible variations of head or cap portion. After one of pins 166a-g is inserted into slot 162b and 164a and one pins 166a-g is inserted into slot 162c and 164b, then that particular pin protrudes out at a right angle with respect to block 164, and can be moved along slots 162b and 162c, depending on which of slots 162b-c, it is located.

The pin of pins 166a-g inserted in slot 162b and 164a and the pin of pins 166a-g inserted in slot 162c and 164b, while attached to block 164, at a ninety degree angle, may have points which can simultaneously be inserted into a wall to attach block 164, strip or plate 162, and the appropriate pins to the surface of the wall along with the use of adhesive 162a, which helps the block 164 to remain attached to the surface of the wall. In some embodiments, the block 164 can be or can be replaced by a hook and/or other type of support. The block 164 is shown as rectangular but may be different shapes or materials.

Figure 19:
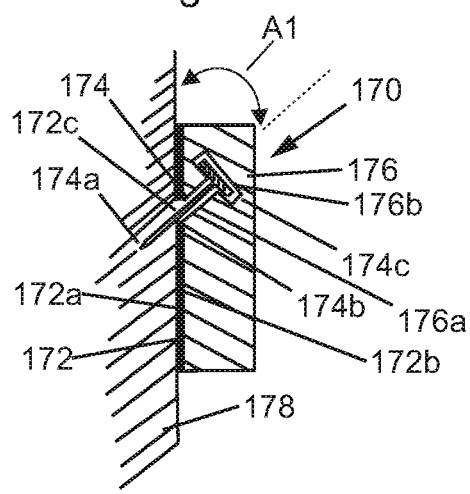
FIG. 19 shows a side cross sectional view of a seventeenth apparatus in accordance with an embodiment of the present invention.

FIG. 19 shows a front, right and top perspective view of an apparatus 170 in accordance with an embodiment of the present invention. The apparatus 170 includes strip or plate 172 having an adhesive surface 172a, opposite side adhesive surface 172b, and slot 172c, through which a pin 174 protrudes at an angle of less than ninety degrees, angle A1 with respect to a block 176 and with respect to a wall 178. The angle A1, in at least one embodiment, may be thirty degrees, and this may work best for at least some embodiments.

The pin 174 includes a point 174a which is shown inserted into the wall 178 along with part of body portion 174b. The pin also includes head portion 174c which is inserted in slot 176b of the block 176. The block includes an angled slot 176a in which part of the body portion 174b of the pin 174 resides. The adhesive surface 172a of the strip or plate 172 sticks to a surface of the wall 178 and along with pin 174 mounts the block 176, strip 174, and pin 172 to the wall 178. In some embodiments, the block 176 can be or can be replaced by a hook and/or other type of support. The block 176 is shown as rectangular but may be different shapes or materials.

FIG. 20A shows a front, right and top perspective view of an apparatus 180 in accordance with an embodiment of the present invention next to a wall 188. The apparatus 180 includes strip or plate 181 having an adhesive surface 181a, and an opposite side adhesive surface 181b. The apparatus 180 further includes a pin 182 protruding through the strip or plate 181 and fixed to a block 183. The block 183 has a slot 183a. The apparatus also includes the block 184 which has an opening 184a, and a protrusion 184b. The block 184 may be attached to the block 183 by inserting the protrusion 184b into the slot, opening or indentation 183a. Block 183 has adhesive two-sided strip/film 181 that can be re-attached from the wall 188 by pulling down that elongated part of the strip 181, that protrudes beyond block 183.

The point of pin 182 may be inserted into the wall 188 at a right angle, to attach pin 182, components 181, 183, and 184 to the wall 188. In some embodiments, the block 183 can be or can be replaced by a hook and/or other type of support. The block 183 is shown as rectangular but may be different shapes or materials.

FIG. 20B shows an apparatus 190 which may be used in place of components 181, 182, and 183 shown in FIG. 20A. The apparatus 190 includes plate or strip 192 which may include adhesive side 192a, opposite adhesive side 192d, opening 192c, and extension or protrusion 192b. The apparatus 190 further includes plate or strip 193 which may include slot 193a, adhesive side 193b, and adhesive side 193c. The apparatus 190 also includes block 194 which may include slot 194a into which component 184b may be inserted of block 184. The block 194 may also include slot 194b into which head or cap portion 196b of pin 196 may be inserted. The pin 196 may also include a pin body portion 196a which may be inserted through opening 192c.

The point of pin 196a may be inserted into the wall 188 at a right angle, to attach pin 196, components 192, 190, and 184 to the wall 188. In some embodiments, the block 194 can be or can be replaced by a hook and/or other type of support. The block 194 is shown as rectangular but may be different shapes or materials.

FIG. 21A shows a right, top, and front perspective view of components 201, 202, 203, 204, 206, and 207 and a right, bottom and rear perspective view of component 205.

FIG. 21A shows component or block 205 having slots 205a and 205b and packet or chamber 205c.

FIG. 21A shows apparatus 200 which may include component 201, 205, 206 and 207 and one of the three components 202, 203, and 204.

The component 201 may be a plate or strip having an adhesive surface 201a, an opposite adhesive surface 201b, protruding portion 201c, and openings 201d and 201e.

The component 202 may include a block 202d having flanges or protrusions 202c and 202e fixed thereto, and having pins 202a and 202b projecting out from the block 202d at a right angle.

The component 203 may include a block 203c having pins 203a and 203b projecting out from the block 203c at a right angle, and having slots 203d and 203e, for inserting either of cap portions 206b of pin 206 or 207b of pin 207. The pins 206 and 207 also include pin body portions 206a and 207a.

The component 204 may include a block 204c having pins 204a and 204b projecting out from the block 204c at a right angle and having an angled slot 204d for inserting either of cap portions 206b of pin 206 or 207b of pin 207. In some embodiments, the block 204c can be or can be replaced by a hook and/or other type of support. The block 204c is shown as rectangular but may be different shapes or materials.

FIG. 21B shows a front, right, and top perspective view of the component or block 205 having slots 205a and 205b.

FIG. 21C shows a front, right, and top perspective view of the component 201 and the component 202 connected to the component 205, so that the block 202d is inside of a pocket or chamber 205c and the flanges or protrusions 202c and 202e, protrude out from slot 205b and an opposite slot, not shown.

Figure 22:
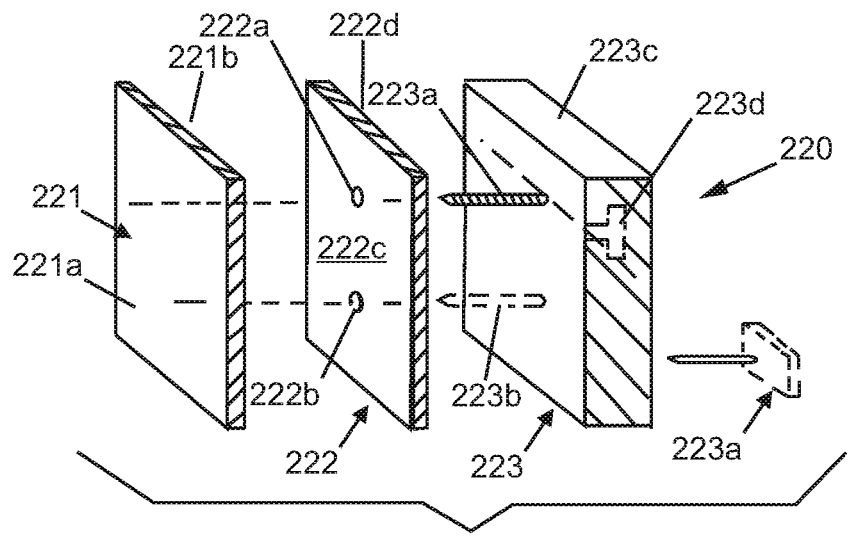
FIG. 22 shows a front, right, and top perspective view of a twenty-first apparatus in accordance with an embodiment of the present invention.

FIG. 22 shows a front, right, and top perspective view of an apparatus 220 which includes strip or plate 221, strip or plate 222, block 223, and pin 223a. The strip or plate 221 may have adhesive surfaces 221a and 221b. The strip or plate 222 may have adhesive surfaces 222c and 222d and openings 222a and 222b. The block 223c may have pins 223a and 223b which protrude out at a ninety degree angle with respect to block 223c. The block 223 may have slot 223d, in which a cap or head portion of pin 223a can be inserted and the pin 223a can project out from block 223 at a right angle. In some embodiments, the block 223 can be or can be replaced by a hook and/or other type of support. The block 223 is shown as rectangular but may be different shapes or materials.

Figure 23:
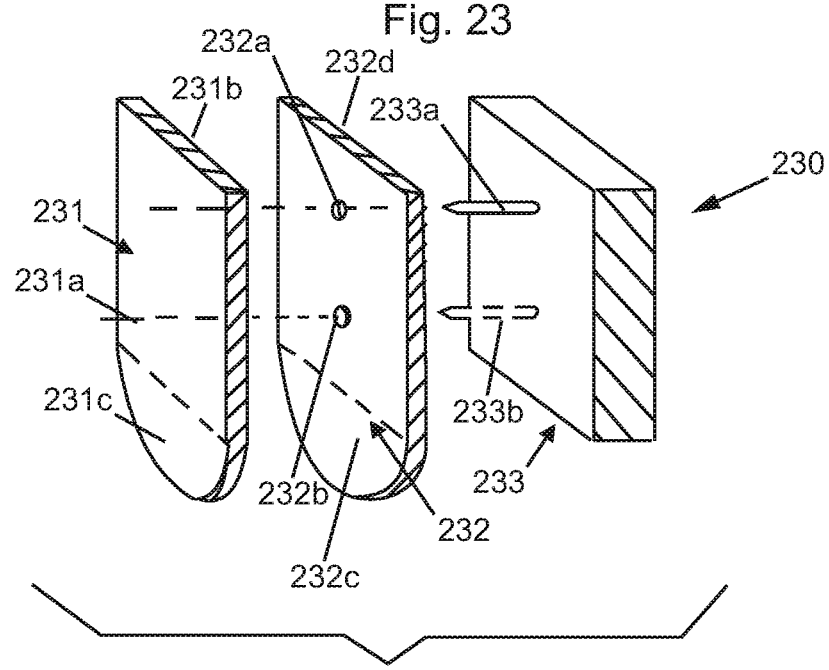
FIG. 23 shows a front, right, and top perspective view of a twenty-second apparatus in accordance with an embodiment of the present invention.

FIG. 23 shows a front, right, and top perspective view of an apparatus 230 which includes strip or plate 231, strip or plate 232, and block 233. The strip or plate 231 may have adhesive surfaces 231a and 231b, and a protruding part 231c, for pulling the strip 231 off of a wall. The strip or plate 232 may have adhesive surfaces 232c and 232d and openings 232a and 232b. The block 233 may have pins 233a and 233b which protrude out at a ninety degree angle with respect to block 233c. The pins 233a and 233b can be inserted through openings 232a and 232b, respectively, and through component 231 and into a wall, not to shown. In the embodiment of FIG. 23, the strip 231 would be punctured by pins 233a and 233b. In some embodiments, the block 106 can be or can be replaced by a hook and/or other type of support. The block 106 is shown as rectangular but may be different shapes or materials.

FIG. 24 shows a side cross sectional view of an apparatus 240 in accordance with another embodiment of the present invention. The apparatus 240 includes a strip or plate 242, a block 244, and a pin 246 and is shown attached to a wall 248. The strip or plate 242 may have an adhesive side attached to the surface of the wall 248 and an opposing adhesive side attached to a surface of the block 244. The pin 246 may have a portion 246a which is at least partially inserted into the wall 248. The pin 246 may also have a head or cap portion 246b which may be inserted in an opening or slot of the block 244. The pin body portion 246a may project out at ninety degrees with respect to block 244. In some embodiments, the block 106 can be or can be replaced by a hook and/or other type of support. The block 106 is shown as rectangular but may be different shapes or materials.

FIG. 25 shows a side cross sectional view of an apparatus 250 in accordance with another embodiment of the present invention. The apparatus 250 includes a strip or plate 252, a block 254, and a pin 256 and is shown attached to a wall 258. The strip or plate 252 may have an adhesive side attached to the surface of the wall 258 and an opposing adhesive side attached to a surface of the block 254. The pin 256 may have a portion 256a which is at least partially inserted into the wall 258. The pin 256 may also have a head or cap portion 256b which may be inserted in an opening or slot of the block 254. The pin body portion 256a may project out at ninety degrees with respect to block 254. In some embodiments, the block 254 can be or can be replaced by a hook and/or other type of support. The block 254 is shown as rectangular but may be different shapes or materials.

FIG. 26 shows a side cross sectional view of an apparatus 260 in accordance with another embodiment of the present invention. The apparatus 260 includes a strip or plate 262, a block 264, and pins 266 and 268 and is shown attached to a wall 269. The strip or plate 262 may have an adhesive side attached to the surface of the wall 269 and an opposing adhesive side attached to a surface of the block 264. The pins 266 and 268 may have portions 266a and 268a which are at least partially inserted into the wall 269. The pins 266 and 268 may also have head or cap portions 266b and 268b which may be inserted in an opening or slot of the block 264. The pin body portions 266a and 268a may project out at ninety degrees with respect to block 264.

In some embodiments, the block 264 can be or can be replaced by a hook and/or other type of support. The block 264 is shown as rectangular but may be different shapes or materials.

FIG. 27 shows a side cross sectional view of an apparatus 270 in accordance with another embodiment of the present invention. The apparatus 270 includes a strip or plate 272, a block 274, and a pin 276 and is shown attached to a wall 278. The strip or plate 272 may have an adhesive side attached to the surface of the wall 278 and an opposing adhesive side attached to a surface of the block 274. The pin 276 may have a portion 276a which is at least partially inserted into the wall 258. The pin 276 may also have a head or cap portion 276b which may be inserted in an opening or slot of the block 274. The pin body portion 276a may project out at an angle which is less than ninety degrees with respect to block 274. In some embodiments, the block 274 can be or can be replaced by a hook and/or other type of support. The block 274 is shown as rectangular but may be different shapes or materials.

FIG. 28 shows a side cross sectional view of an apparatus 280 in accordance with another embodiment of the present invention. The apparatus 280 includes a strip or plate 282, a block 284, and a pin 286 and is shown attached to a wall 288. The strip or plate 282 may have an adhesive side attached to the surface of the wall 288 and an opposing adhesive side attached to a surface of the block 284. The pin 286 may have a portion 286a which is at least partially inserted into the wall 288. The pin 286 may also have a head or cap portion 286b which may be inserted in an opening or slot of the block 284. The pin body portion 286a may project out at an angle which is less than ninety degrees with respect to block 284. In some embodiments, the block 284 can be or can be replaced by a hook and/or other type of support. The block 284 is shown as rectangular but may be different shapes or materials.

FIG. 29 shows a side cross sectional view of an apparatus 290 in accordance with another embodiment of the present invention. The apparatus 290 includes a strip or plate 292, a block 294, and a pin 296 and is shown attached to a wall 298. The strip or plate 292 may have an adhesive side attached to the surface of the wall 298 and an opposing adhesive side attached to a surface of the block 294. The pin 296 may have a portion 296a which is at least partially inserted into the wall 298. The pin 296 may also have a head or cap portion 296b which may be inserted in an opening or slot of the block 294. The pin body portion 296a may project out at an angle which is less than ninety degrees with respect to block 294. In some embodiments, the block 294 can be or can be replaced by a hook and/or other type of support. The block 294 is shown as rectangular but may be different shapes or materials.

FIG. 30 shows a side cross sectional view of an apparatus 300 in accordance with another embodiment of the present invention. The apparatus 300 includes a strip or plate 302, a block 304, and a pin 306 and is shown attached to a wall 308. The strip or plate 302 may have an adhesive side attached to the surface of the wall 308 and an opposing adhesive side attached to a surface of the block 304. The pin 306 may have a portion 306a which is at least partially inserted into the wall 308. The pin 306 may also have a head or cap portion 306b which may be inserted in an opening or slot of the block 304. The pin body portion 306a may project out at ninety degrees with respect to block 304.

In some embodiments, the block 304 can be or can be replaced by a hook and/or other type of support. The block 304 is shown as rectangular but may be different shapes or materials.

In FIGS. 24-29 each of plates or strips 242, 252, 262, 272, 282, and 292, have a portion which extends below the block they are attached to, to allow the respective apparatuses 240, 250, 260, 270, 280, and 290 to be detached from the walls 248, 258, 268, 278, 288, and 298, by pulling the extended portion of the appropriate plate or strip.

Figure 31:
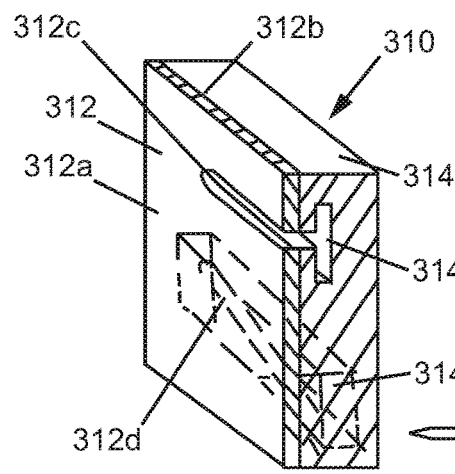
FIG. 31 shows a front, right and top perspective view of a twenty-ninth apparatus in accordance with an embodiment of the present invention.

FIG. 31 shows a right, front, and top perspective view of an apparatus 310 including a strip or plate 312, and a block 314. The strip 312 includes adhesive surfaces 312a and 312b, and slots 312c and 312d. The block includes slots 314a and 314b. A pin, such as pin 322 can have its head portion slid into slots 314a or 314b, and will project out at an angle of ninety degrees from block 314 and strip 312.

Figure 32:
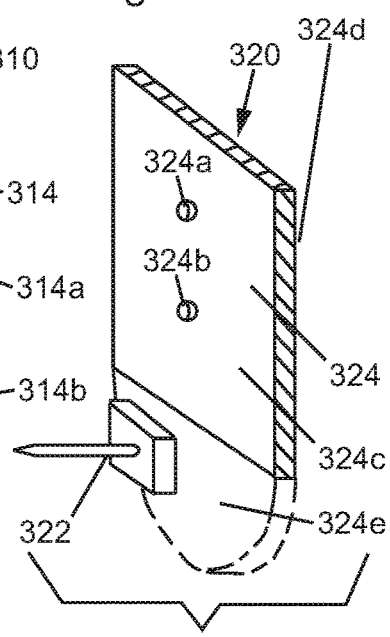
FIG. 32 shows a front, right and top perspective view of a thirtieth apparatus in accordance with an embodiment of the present invention.

FIG. 32 shows a right, front, and top perspective view of an apparatus 320 including pin 322, and strip 324. The strip 324 includes openings 324a and 324b, and adhesive surfaces 324c and 324d, and extension portion 324e.

Figure 33:
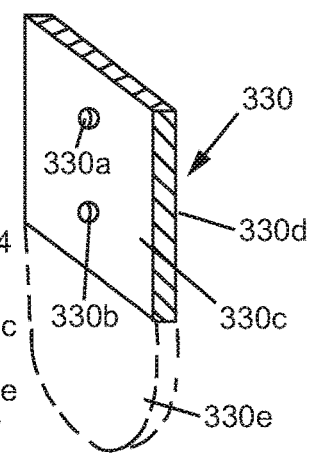
FIG. 33 shows a front, right and top perspective view of a thirty-first apparatus in accordance with an embodiment of the present invention.

FIG. 33 shows a right, front, and top perspective view of any apparatus 330 including openings 330a-b, adhesive surfaces 330c-d, and extension 330e.

Figure 34:
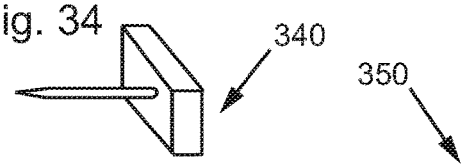
FIG. 34 shows a front, right, and top perspective view of a pin in accordance with an embodiment of the present invention which can be used with at least the apparatuses of FIGS. 11-16, 17, 19, 20B, 20C, 21A-21C, 22, 31-33, 36, and 37, by having its cap or head portion inserted into a slot.

FIG. 34 shows a right, front, and top perspective view of a pin 340.

Figure 35:
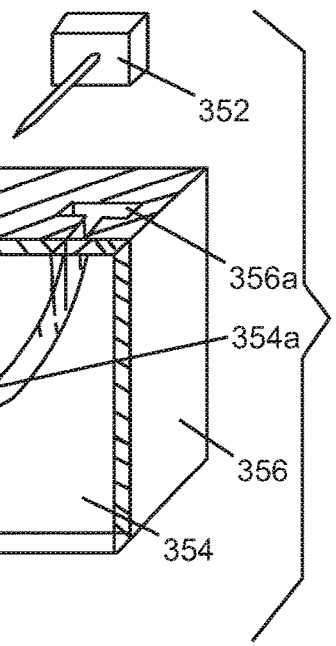
FIG. 35 shows a front, right, and top perspective view of a pin which may be identical to the pin of FIG. 34 along with a thirty-second apparatus in accordance with an embodiment of the present invention.

FIG. 35 shows a right, front, and top perspective view of an apparatus 350, which may include a pin 352, a strip 354, and a block 356. The strip 354 which may have adhesives on two sides includes a slot or opening 354a and the block 356 includes a slot 356a. The head portion of the pin 352 may be inserted in the slot 356a and the pin may protrude out from the slot or opening 354a.

Figure 36:
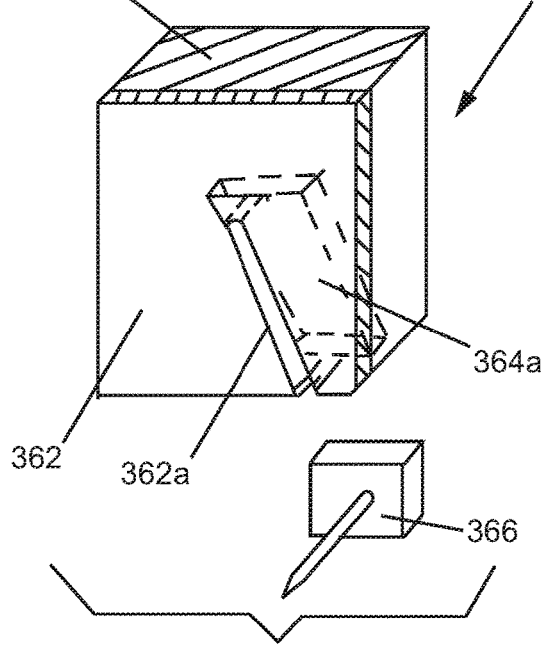
FIG. 36 shows a front, right, and top perspective view of a pin which may be identical to the pin of FIG. 34 along with a thirty-third apparatus in accordance with an embodiment of the present invention.

FIG. 36 shows a right, front, and top perspective view of an apparatus 360 which may include a strip 362 which may have adhesives on two sides, and a block 364. The strip 362 may include a slot 362a and the block 364 may include a slot 364a, into which the head or cap portion of the pin 366 can be inserted, and the pin may protrude out from the slots 364a and 362a.

FIG. 37 shows a right, front, and top perspective view of an apparatus 370 which may include strip 372, which may have adhesives on two sides, a pin 373, a block 374, a pin 375, a strip 376 which may have adhesive on both sides, and pins 377 and 379. The pins 373, 375, 377, and 379 may protrude out from block 374 at a ninety degree angle.

FIG. 38 shows a right, front, and top perspective view of an apparatus 380 which may include strip 382, which may have adhesives on two sides, a pin 383, a block 384, a pin 385, a strip 386 which may have adhesive on both sides, and pins 385 and 387. The pins 383, 385, and 387 may protrude out from block 384 at a ninety degree angle.

FIG. 39 shows a right, front, and top perspective view of an apparatus 390 which may include strip 392, which may have adhesives on two sides, a block 394, a strip 396 which may have adhesive on both sides, and pins 391, 393, and 397. The pins 391, 393, and 397 may be inserted into slots 392a, 392b, and 394b, respectively, so that they protrude out from block 394 at a ninety degree angle. The strip 392 may include the slots 392a and 392b. The strip 392 may include extension 392c. The block may include the slots 394a and 396a. The strip 396 may include the slot 396a.

FIG. 40 shows a right, front, and top perspective view of an apparatus 400 which may include pins 402 and 404, strip 406 (which may have adhesives on two sides), block 408, and strip 409 (which may have adhesives on two sides). Pins 402 and 404 may protrude out at a ninety degree angle from block 408.

The blocks 374, 384, 394, 408 are shown as rectangular but may be different shapes or materials.

Figure 41:
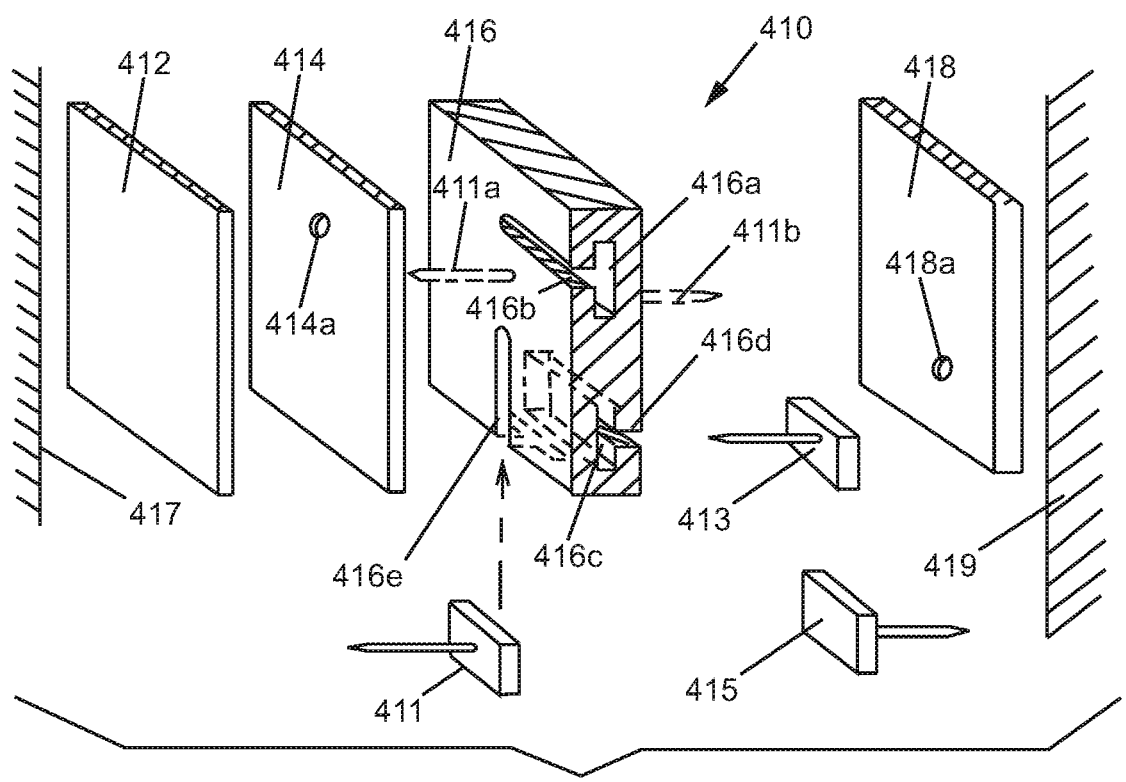
FIG. 41 shows a front, right and top perspective view of a thirty-eighth apparatus in accordance with an embodiment of the present invention near two walls.

FIG. 41 shows a right, front, and top perspective view of an apparatus 410, which may include pin 411, strip 412 (which may have adhesives on two sides), pin 413, strip 414 (which may have adhesives on two sides), pin 415, block 416, and strip 418 (which may have adhesives on two sides). FIG. 41 also shows walls or surfaces 417 and 419. Strip 414 includes opening 414a. Strip 418 includes opening 418a. Block 416 has pin 411a attached, (pin 411b on opposite side) and includes slots 416a, 416b, 416c, 416d, and 416e. The pin 411 can be inserted into slot 416e. The pin 413 can be inserted in slot 416a. The pin 415 can be inserted into slot 416c.

The blocks 416 is shown as rectangular but may be different shapes or materials.

Figure 42:
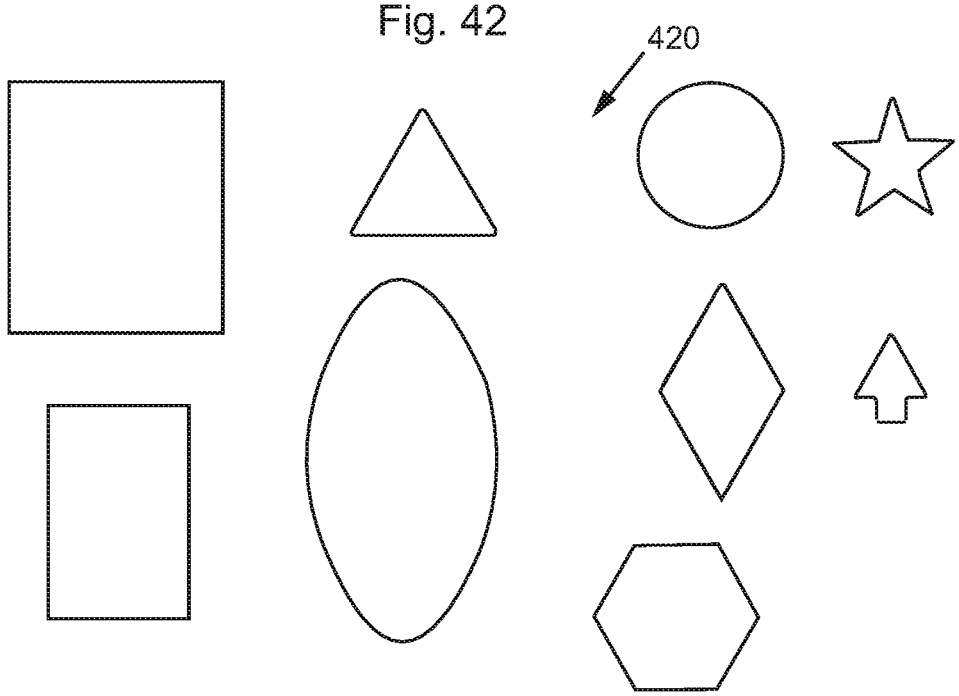
FIG. 42 shows a diagram of a plurality of possible shapes.

FIG. 42 shows a diagram 420 of a plurality of shapes. A block, in accordance with any one of FIGS. 1-41, may be in one of the shapes and their variations of diagram 420.

Figure 43:
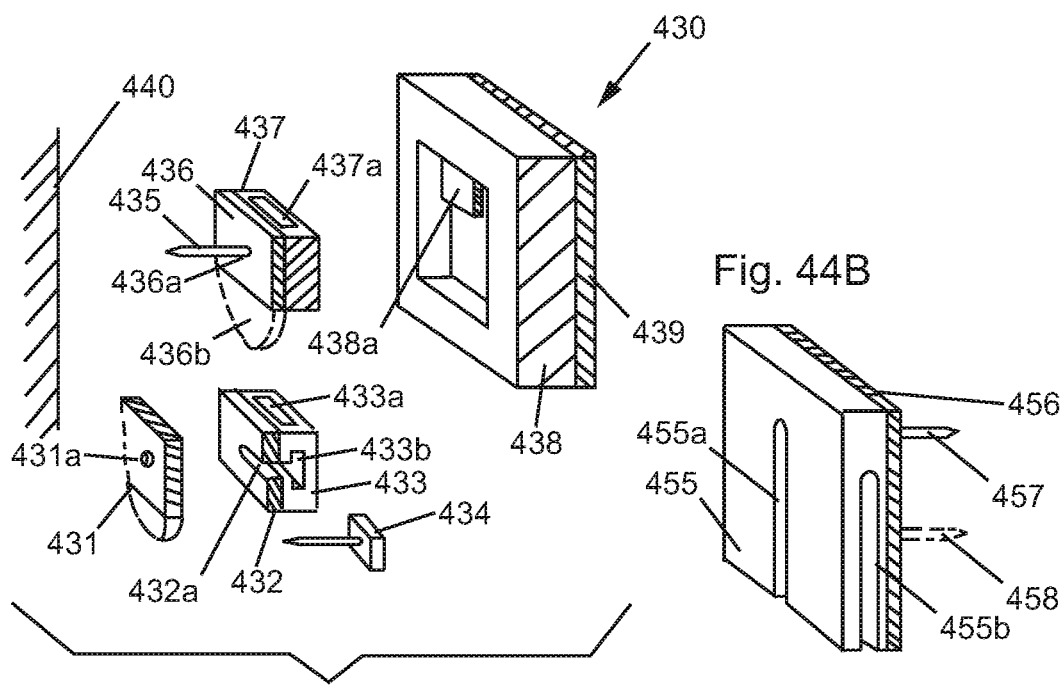
FIG. 43 shows a front, right and top perspective view of a thirty-ninth apparatus in accordance with an embodiment of the present invention near a wall.

FIG. 43 shows a front, right, and top perspective view of an apparatus 430 which may include a strip 431 (which may have adhesives on two sides), a strip 432 (which may have adhesives on two sides), a block 433, a pin 434, a pin 435, a strip 436 (which may have adhesives on two sides), a block 437, a block 438, and a strip 439 (which may have adhesives on two sides), which are shown next to a wall 440. The strip 431 includes an opening 431a. The strip 432 includes an opening 432a. The block 433 includes slot 433a and slot 433b. The strip 436 includes an opening 436a and an extension portion 436b. The block 437 includes a slot 437a into which a protrusion 438a of block 438 may be inserted to attach block 438 to block 437.

Protrusion 438a may be inserted into slot 433a to attach block 438 to block 433. Pin 434 may be inserted to the body of block 433, by having head or cap portion of pin 434 inserted into slot 433b, and the thin, elongated portion protrude out at a right angle from slot 432a of strip 432, and through opening 431a of strip 431, and then the elongated portion of the pin 434 can be inserted into wall 440, and the adhesive side of 431 is also attached to the surface of wall 440.

Figure 44B:
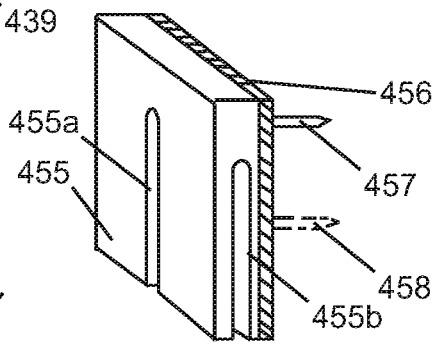
FIG. 44B shows a front, right and top perspective view of a component of the fortieth apparatus of FIG. 44A.
Figure 44A:
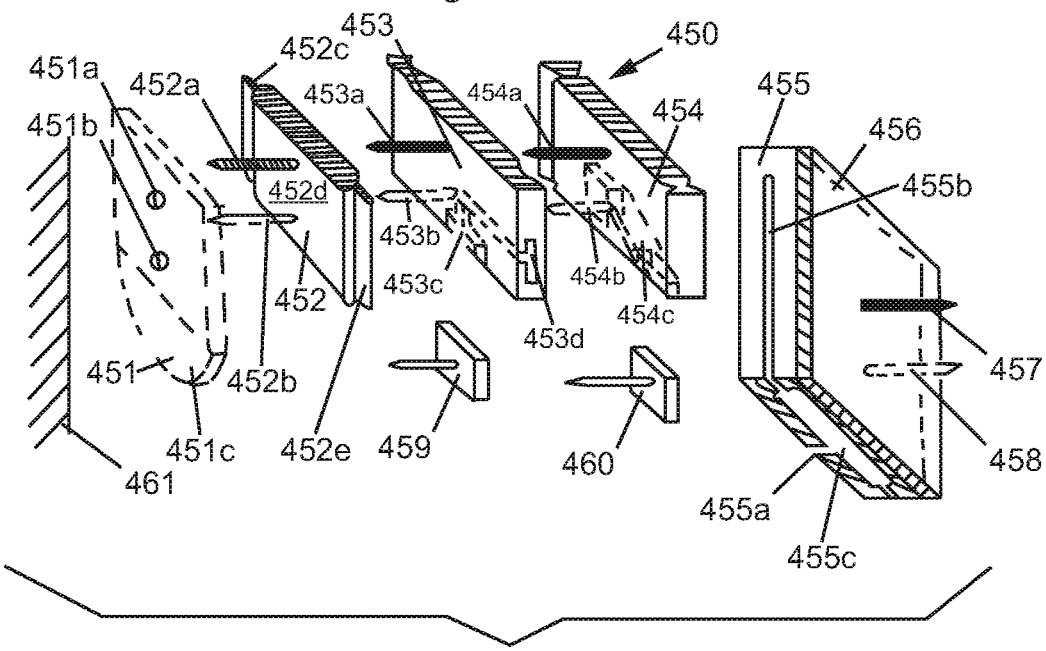
FIG. 44A shows a front, right and top perspective view of a fortieth apparatus in accordance with an embodiment of the present invention near a wall, with the exception of a rear, bottom, right view of one component.

FIG. 44A shows a front, right, and top perspective view of an apparatus 450 (except for right, rear, and bottom view of block 455) which may include a strip 451, a block 452, pins 452a and 452b, a block 453, a block 454, and a block 455, which are shown next to a wall 461. The strip 451 includes openings 451a and 451b and extension 451c. The block 452 includes pins 452a and 452b, flanges or extensions 452c and 452e, and block portion 452d. The block 453 includes pins 453a and 453b, and slots 453c, into which pins 459 and 460, respectively, can be inserted. The block 454 includes pins 454a and 454b and 454c. The block 455 includes slots 455a and 455b and chamber opening 455c. The block 456 includes pins 457 and 458.

FIG. 44B shows a right, front, and top perspective view of apparatus 450. FIG. 44B shows slots 455a and 455b, pins 457 and 458, and strip 456 (which may have adhesives on two sides).

The blocks 437, 433, 438, 455, 452, 453, 454, and 455 are shown as rectangular but may be different shapes or materials.

Figure 45:
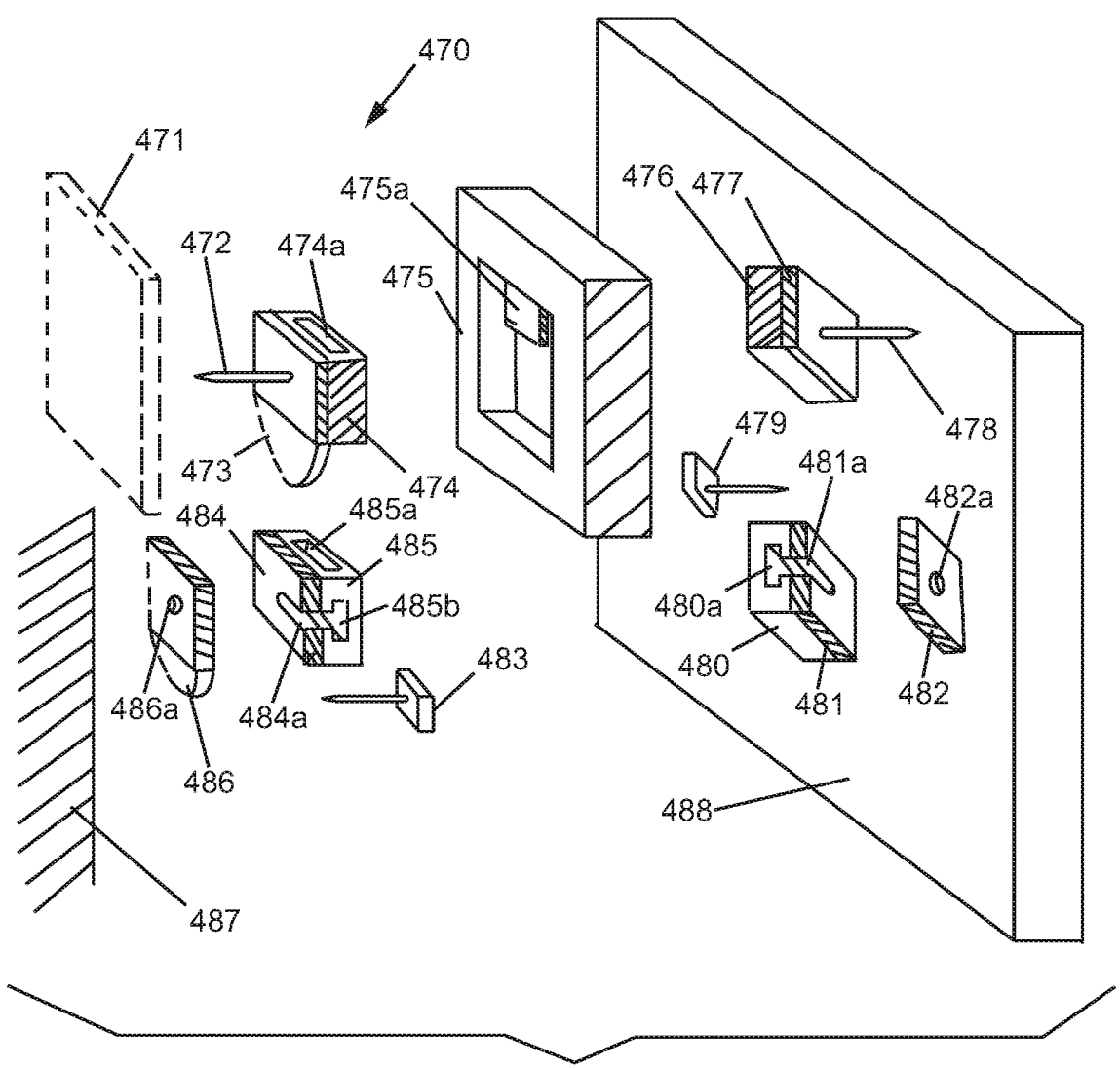
FIG. 45 shows a front, right and top perspective view of a forty-first apparatus in accordance with an embodiment of the present invention near a wall.

FIG. 45 shows perspective views of various components of an apparatus 470 next to a wall 487. The apparatus 470 may include strip 471, pin 472, extension 473, block 474, block 475, block 476, strip 477, pin 478, pin 479, block 480, strip 481, strip 482, pin 483, strip 484, block 485, strip 486, and block 488 which may be a back of a photo frame or picture frame.

Block 474 may include a slot 474a. Block 475 may include protrusion 475a. Block 480 may include slot 480a. Strip 481 may include slot 481a. Strip 482 may include opening 482a. Strip 484 may include slot 484a. Block 485 may include slot 485a and slot 485b. Strip 486 may include opening 486a.

The blocks 474, 475, 485, 476, 480, and 488 are shown as rectangular but may be different shapes or materials.

Figure 46:
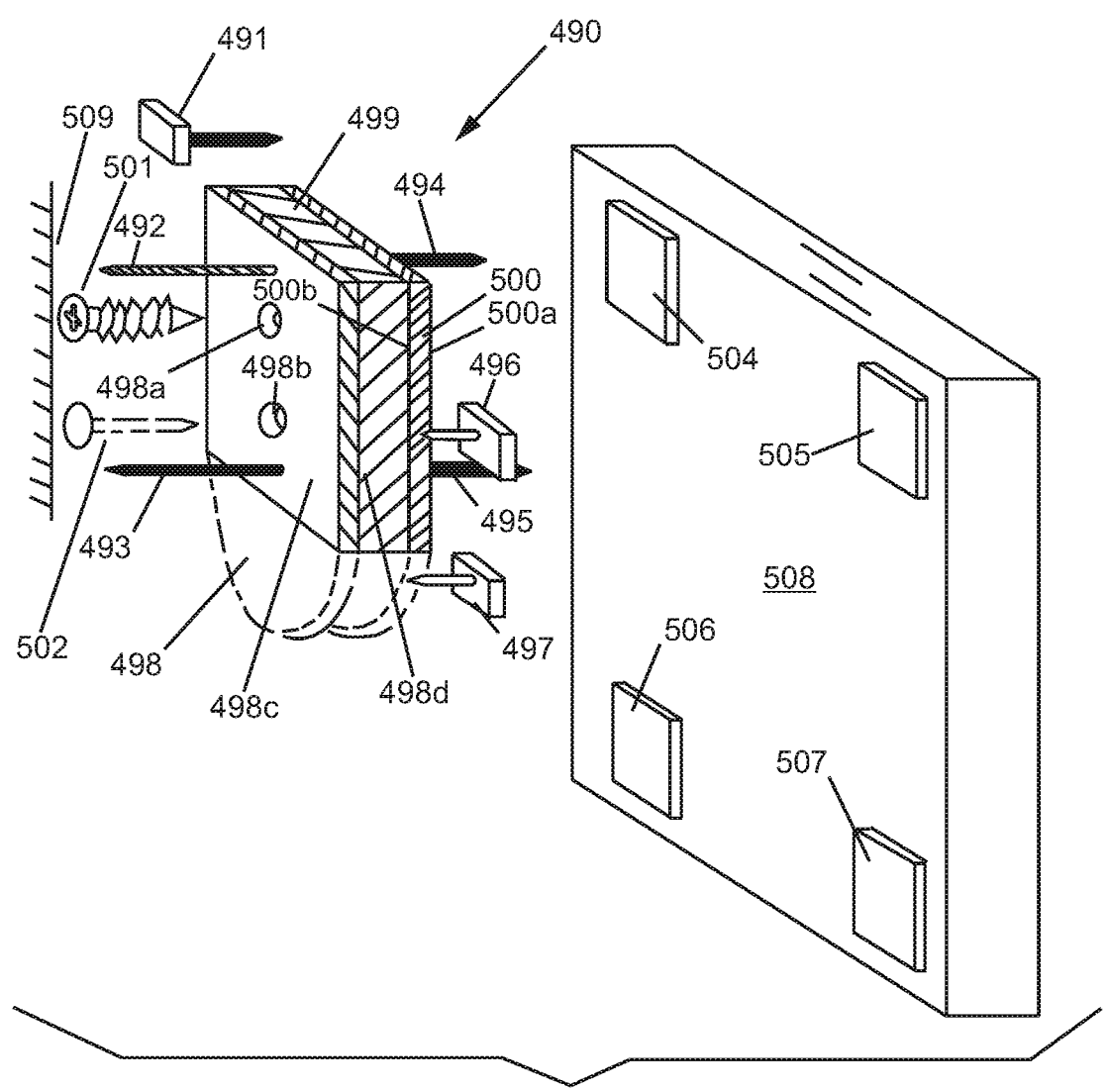
FIG. 46 shows a front, right and top perspective view of a forty-second apparatus in accordance with an embodiment of the present invention near a wall.

FIG. 46 shows a right, top, and front perspective view of an apparatus 490. The apparatus 490 may include pins 491, 492, 493, 494, 495, 496, and 497. The apparatus 490 may also include strip 498 (may have adhesives on two sides) having an extension portion, block 499, and strip 500 (which may have adhesives on two sides). The apparatus 490 may further include screw 501, and nail 502. The apparatus 490 may include block 508 having strips 504, 505, 506, and 507. The apparatus 490 is shown next to wall 509. The blocks 499 and 508 are shown as rectangular but may be different shapes or materials. The strip 498 may have openings 498a and 498b into which fasteners 501 and 502, respectively, are configured to be inserted. The strip 498 may have side 498c and opposing side 498d, both of which have adhesive. Similarly, the strip 500 may have side 500a and opposing side 500b, both of which may have adhesive.

Figure 47:
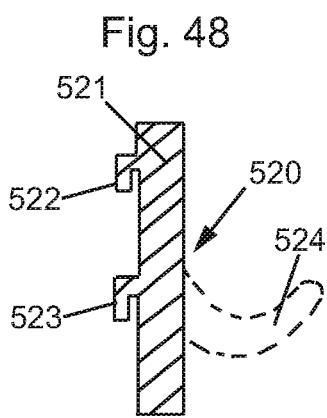
FIG. 47 shows a side cross sectional view of a forty-third apparatus in accordance with an embodiment of the present invention attached to a wall.

FIG. 47 shows a side cross sectional view of an apparatus 510 which may include a strip 501 (which may have adhesives on two sides), a block 502, and a component 503.

In at least one embodiment of the present application, the component 503 is used to push the pins 504 and 505 into the wall 506, to attach the block 502 and strip 501 to wall 506. The strip 501 may have adhesive on both sides, similar to strips disclosed in previous embodiments.

After the pins 504 and 505 have been pushed into the wall 506, the component 503 is separated from the component 502, and then block 521 is attached to the block 502 by inserting portions 522 and 523 into slots 502a and 502b. The block 521 may be a shelf support or hanger support of an apparatus 520.

Figure 48:
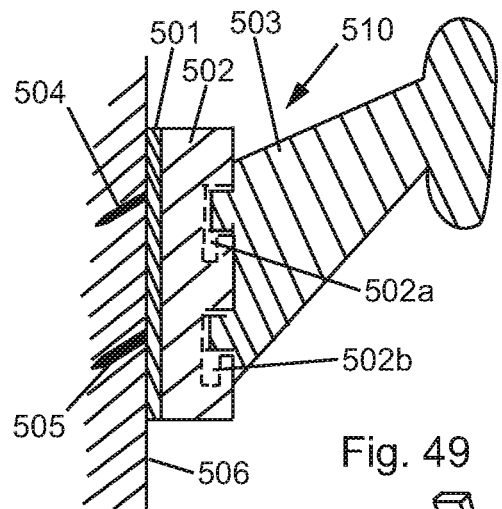
FIG. 48 shows a side cross sectional view of a forty-fourth apparatus in accordance with an embodiment of the present invention.

FIG. 48 shows a side cross sectional view of the apparatus 520 which may include block 521, protrusions 522 and 523, and a hook 524. The hook 524 may be different configurations and is shown in dashed lines.

Figure 49:
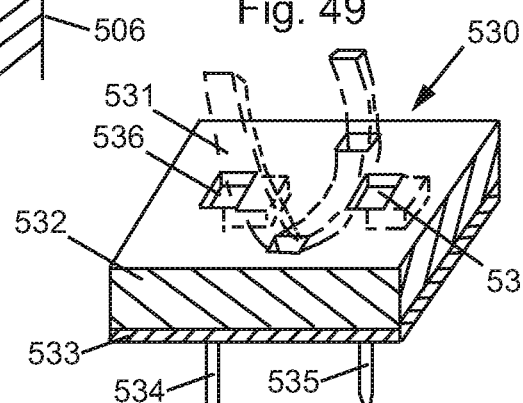
FIG. 49 shows a front, right and top perspective view of a forty-fifth apparatus in accordance with an embodiment of the present invention.

FIG. 49 shows a top, right, front, perspective view of an apparatus 530 which includes U-shaped component 531, block 532, a strip 533 (which may have adhesives on two sides), a pin 534, a pin 535, and openings 536 and 537.

Figure 50:
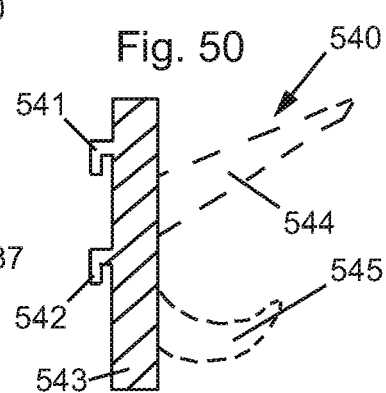
FIG. 50 shows a side cross sectional view of a forty-sixth apparatus in accordance with an embodiment of the present invention.

FIG. 50 shows a side cross sectional view of an apparatus 540 which includes block 543 and protrusions 541 and 542, and components 544 and 545.

The U-shaped component 531 may be used to push pins 534 and 535 into a wall, and then detached from openings 536 and 537, or the component 531 may be a cable tie or similar device for connection of extra components to the block 532. The protrusions 541 and 542 may then be attached to openings 536 and 537 to attach block 543 to block 532. The components 544 and 545 may be, for example, hooks or shelf supports.

Figure 51:
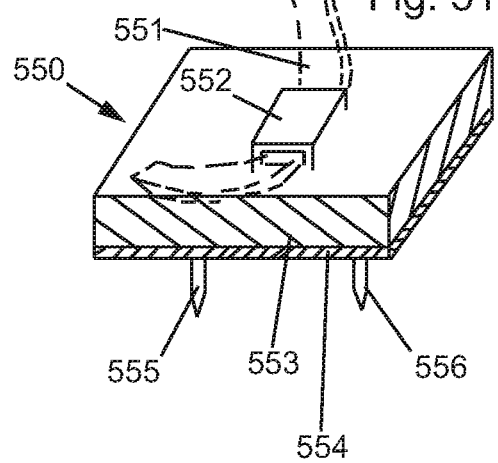
FIG. 51 shows a front, right and top perspective view of a forty-seventh apparatus in accordance with an embodiment of the present invention.

FIG. 51 shows a front, top, and right perspective view of an apparatus 550, which includes component 551, component 552, pin 555, block 553, strip 554 (which may have adhesives on two sides), and pin 556.

Figure 52:
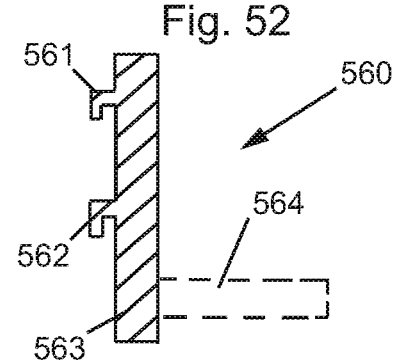
FIG. 52 shows a side cross sectional view of a forty-eighth apparatus in accordance with an embodiment of the present invention.

FIG. 52 shows a side cross sectional view of an apparatus 560, including block 563 and protrusions 561 and 562 and component 564.

The component 551 may be used to push the pins 555 and 556 into a wall, and thereafter detached from component 552. In addition, the component 551 may be a cable tie or similar device for connection of extra components to the block 553. One of the protrusions 561 and 562 may be inserted into the component 552 to attach the block 563 to the block 553. The blocks 502, 521, 532, 543, 553, and 563 are shown as rectangular but may be different shapes or materials.

FIG. 53 shows a side cross sectional view of an apparatus 570 including pins 571 and 572, strip 573 (which may have adhesives on two sides), block 574, and openings 574a and 574b. The pins 571 and 572 are shown inserted into wall 575. The block 574 is shown as rectangular but may be different shapes or materials.

FIG. 54 shows a, right, top, and rear perspective view of an apparatus 580 includes pins 581 and 582, strip 583 (which may have adhesives on two sides), and block 584. The block 584 may include openings 584a, 584b, and 584c. The apparatus 580 may also include component 586. In at least one embodiment openings 574a, and 574b may be the same as 584a and 584c. In addition, component 586 may be inserted into opening 584a and turn or inserted into opening 584c and turned ninety degrees, and then the block 584 can be detached from the wall 575 by pulling the component 586 in the direction D1. The block 584 is shown as rectangular but may be different shapes or materials.

Figure 55:
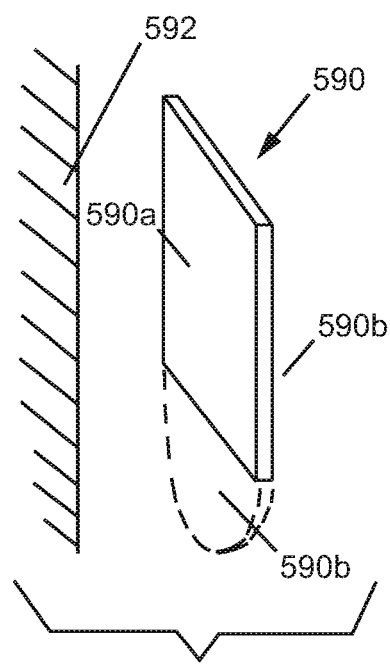
FIG. 55 shows a front, right and top perspective view of a fifty-first apparatus in accordance with an embodiment of the present invention.

FIG. 55 shows a front, right, and top perspective view of an apparatus 590 which may have adhesive on both side 590a and 590b, and which may have an extension portion 590b shown by dashed lines. FIG. 55 also shows a wall 592.

Figure 56:
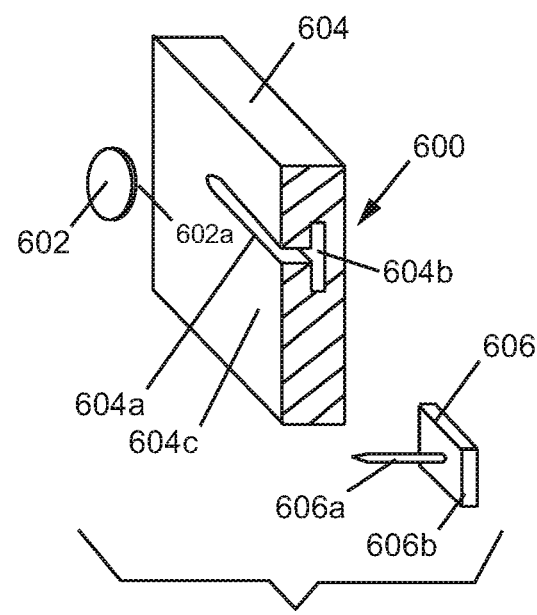
FIG. 56 shows a front, right and top perspective view of a fifty-second apparatus in accordance with an embodiment of the present invention.

FIG. 56 shows a front, right, and top perspective view of an apparatus 600 which may be a block having a thin slot portion 604a, through which a pin thin portion, such as portion 606a of pin 606 can project, and a thicker slot portion 604b into which a cap or head portion 606b of pin 606 can be inserted to thereby hold the pin 606 to block 604, with cap portion 606b in slot portion 604b and with portion 606a projecting outwards from block 604 at a ninety degree angle. A component 602 is shown which may be a one sided adhesive strip or film, having adhesive on side or surface 602a which faces block 604. When the cap or head portion 606b of the pin 606 is inserted into the slot 604b, it may slide in the slot 604b. Once 606 is in a desired position, at least part of portion 606a protrudes out from slot 604a. Then the strip 602 can be placed on the portion 606a of the pin by puncturing the center of the strip 602 and pushing the strip 602 until the adhesive surface 602a comes in contact with the block surface 604c, thus attaching the strip 602 to the block surface 604c. The strip 602 thus sticks to surface 604c—fixing pin 606 inserted into the body of block 604, and preventing from the pin 606 from sliding. Thereafter the pin 606 (with 602, and 604 attached), is used to puncture the strip 590, and then the combination of 590, 602, 606, and 604 is affixed to the wall 592.

Figure 57:
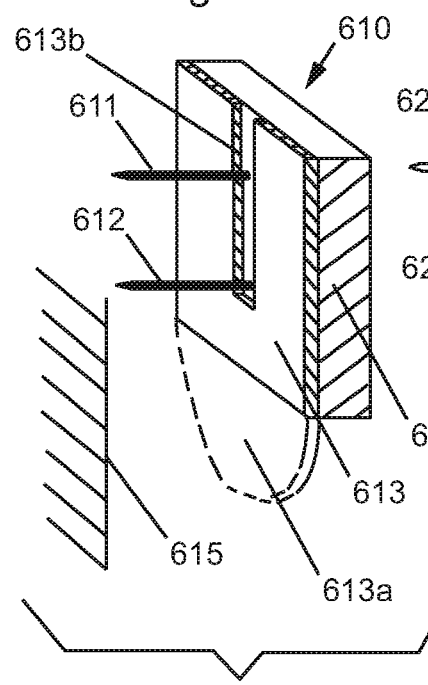
FIG. 57 shows a front, right and top perspective view of a fifty-third apparatus in accordance with an embodiment of the present invention.

FIG. 57 shows a front, right, and top perspective view of an apparatus 610 including a pin 611, a pin 612, a strip 613, and a block 614. The strip 613 may have a slot or opening 613b and an extension portion 613a which extends beyond block 614. The strip 613 may have an adhesive side which is exposed which can be attached to wall 615. The strip 613 may have an opposing adhesive side which is shown attached to the block 614. The extension 613a can be used to remove the strip 613 from the wall 615.

Figure 58:
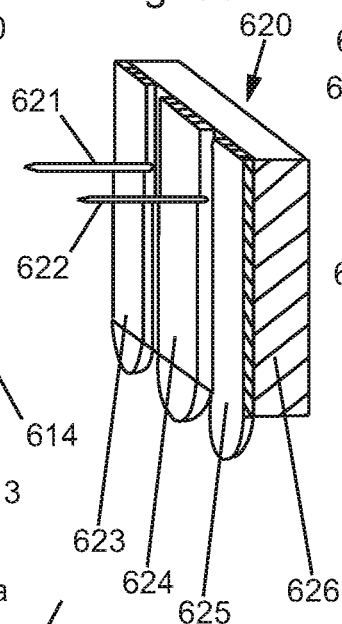
FIG. 58 shows a front, right and top perspective view of a fifty-fourth apparatus in accordance with an embodiment of the present invention.

FIG. 58 shows a front, right, and top perspective view of an apparatus 620 including a pin 621, a pin 622, strips 623, 624, and 625, each of which may have adhesive on both sides, and a block 626. The pins 621 and 622 may project out at a ninety degree angle through gaps between the strips 623, 624, and 625, from the block 626.

Figure 59:
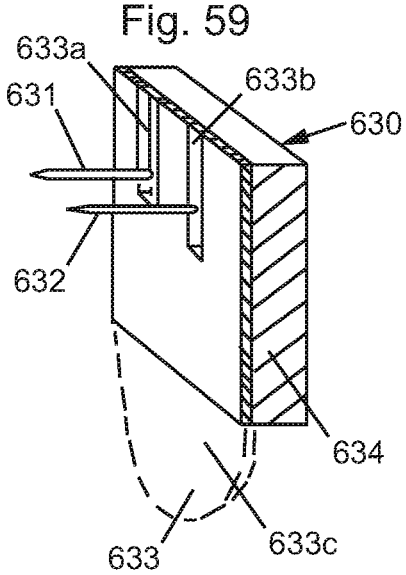
FIG. 59 shows a front, right and top perspective view of a fifty-fifth apparatus in accordance with an embodiment of the present invention.

FIG. 59 shows a front, right, and top perspective view of an apparatus 630 including pins 631 and 632, strip 633, and block 634. The strip 633 may have an exposed adhesive side for attaching to a wall, and an opposing adhesive side attached to the block 634. The strip 633 may include slots 633a and 633b through which pins 631 and 632 protrude, and extension portion 633c.

Figure 60:
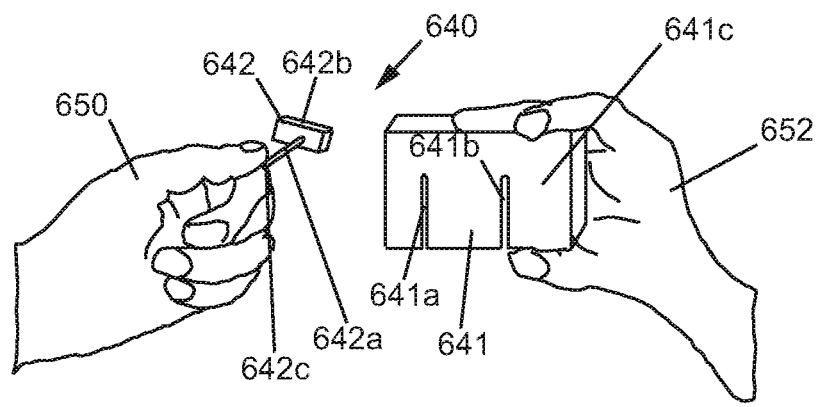
FIG. 60 shows a front, right and top perspective view of a fifty-sixth apparatus in accordance with an embodiment of the present invention, with a pair of hands shown.

FIGS. 60-66 show the process of inserting pins (including pins 642 and 644) into a block 641 attaching an adhesive strip 662 to the pins (642 and 644) and block 641 combination and then inserting the 642, 644, 641, and 661 combination into a wall FIG. 60 shows an apparatus 640 including a block 641 and a pin 642. The pin 642 includes a head or cap portion 642b, a body portion 642a and a point 642c. The block 641 includes a slot 641a and a slot 641b. In operation, a person using their hand 650 may insert the head portion 642b into slot 641a or 641b of block 641 held by hand 652, so that pin body portion 642a is at a right angle with respect to the block 641 and point 642c is outside of the block 641.

Figure 61:
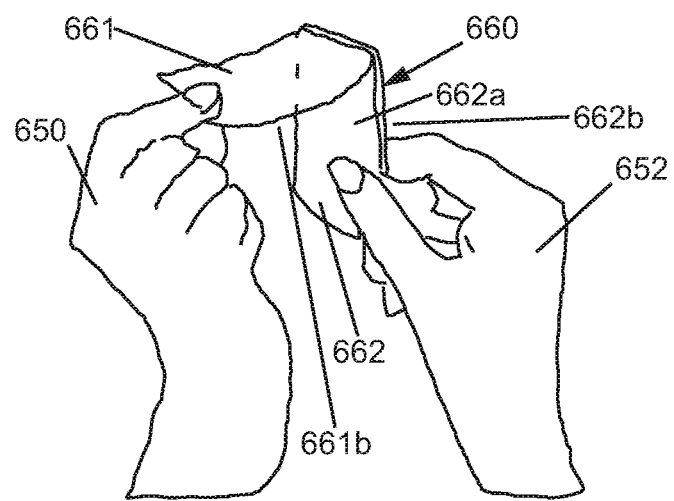
FIG. 61 shows a front, right and top perspective view of a fifty-seventh apparatus in accordance with an embodiment of the present invention, with the pair of hands shown.

FIG. 61 shows an apparatus 660 including portions 661 and 662. The portion 661 is a cover which can be peeled off and is shown held by hand 650 and the portion 662 is held by hand 652. The portion 661 may be a strip or cover. The portion 662 may be a strip including adhesive side 662*a* and an adhesive side 662*b*.

Cover 661 can be torn off to reveal adhesive surface 662*a* of strip or portion 662 and then strip 662 can be used with the apparatus 640, by puncturing the strip 662 with the point 642*c* of the pin 642 and then the adhesive 662*b* can be attached to the surface 641*c* of the block 641 to attach strip 662 to the apparatus 640.

FIG. 62 shows an apparatus 670 including strip 662', block 641, and pins 642 and 644. The strip 662' as shown in FIG. 62 is the strip 662 modified by punching holes 662*c'* and 662*d'* into the strip 662 to change it to strip 662'. The strip 662' includes adhesive surfaces 662*a'* and 662*b'* which may be the same as adhesive surfaces 662*a* and 662*b* shown in FIG. 61, except for the absence of material eliminated by puncturing or punching out holes 662*c'* and 662*d'*.

The pins 642 and 644 are connected to block 641 so that they protrude out at a ninety degree angle from block 641. Pins 642 and 644 have a head or cap portion, similar or identical to head or cap portion 642*b*, inserted in a slot or slot portion 641*c* and 641*d*, respectively, of the block 641. Pins 642 and 644 have thin body portions which project outwards and part of which are inside thin slots or slot portions 641*a* and 641*b*. The strip 662', may have adhesive surfaces on both sides 662*a'* and 662*b'*, and is held by hand 650. The block 641 is held by hand 652.

FIG. 63 shows the apparatus 670 after the strip 662' has been partially attached to the pins 642 and 644 and block 641 combination. In FIG. 63, at least part of the pin 642 has been inserted into the opening 662*d'*. Thereafter, at least part of the pin 644 may be inserted into the opening 662*c'* and then surface 662*b'* may be attached to the surface of the block 641.

Figure 64:
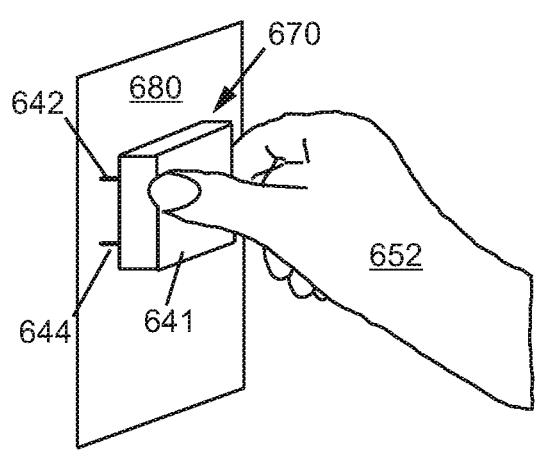
FIG. 64 shows a right, top, and rear view of the combination of FIG. 63 in a fully assembled state during the act of inserting the combination of FIG. 63 into a wall, with one of the pair of hands.

FIG. 64 shows the apparatus 670 including pins 642 and 644, and block 641. The apparatus 670 is shown being inserted into a wall 680. A person holds the block 641 with hand 652.

Figure 65:
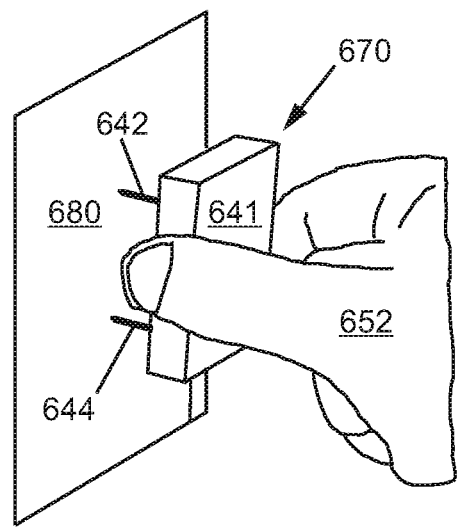
FIG. 65 shows a right, top, and rear view of the combination of FIG. 63 in a fully assembled state during the act of taking the combination of FIG. 63 out of a wall, with one of the pair of hands.

FIG. 65 shows an apparatus 670 including pins 642 and 644, and block 641. The apparatus 670 is shown slightly removed from the wall 680. A person holds the block 641 with hand 652

Figure 66:
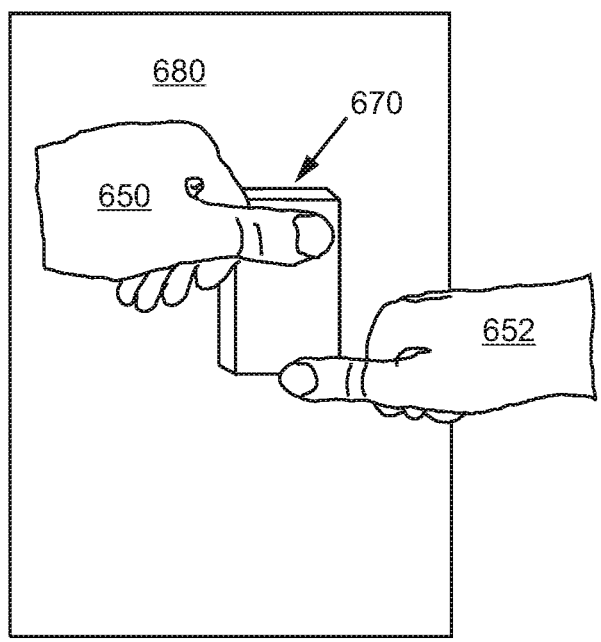
FIG. 66 shows a right, top, and rear perspective view of the combination of FIG. 63 in a fully assembled state during the act of attaching the combination to a wall with the pair of hands.

FIG. 66 shows the apparatus 670 which is being attached to the wall 680 by hands 650 and 652.

Figure 67:
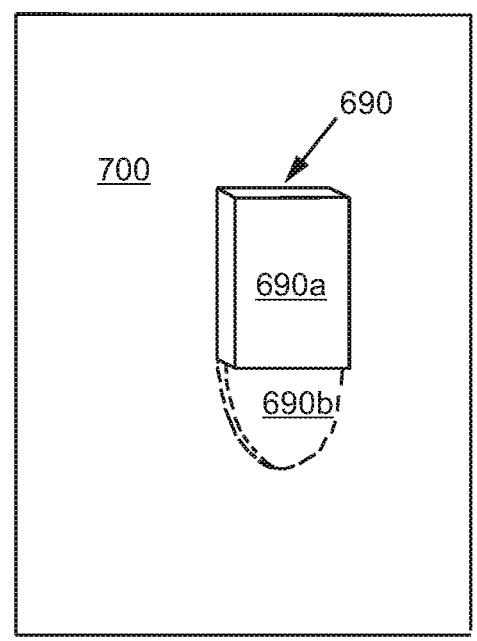
FIG. 67 shows a right, top and rear perspective view of an alternative combination fifty-ninth apparatus to FIG. 63, in a fully assembled state with an extension portion.

FIG. 67 shows an apparatus 690 which is attached to the wall 700. The apparatus 690 may have a block 690*a* and a strip 690*b*. The extension part of strip 690*b* can be seen in dashed lines in FIG. 67. The apparatus 690 can be removed from the wall 700 by using strip 790*b*.

FIGS. 68-73 show the process of inserting pins (including pins 712 and 714) into a block 7111 attaching an strip 721 (with one side adhesive 721*a* and side 721*b* having VELCRO (trademarked) and/or hooks and/or loops on its surface to the pins (712 and 714) and block 711 combination and then attaching the 712, 714, 711, and 721 combination to a VELCRO (trademarked) and/or hooks and/or loops mating portion 742 (or 743) on a wall 741.

Figure 68:
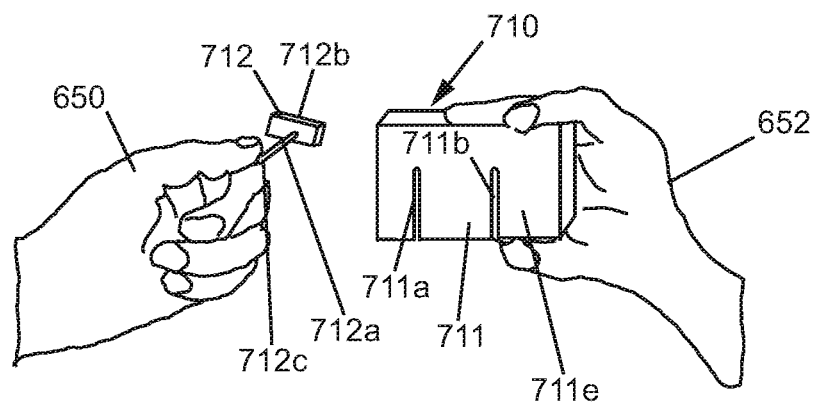
FIG. 68 shows a front, right and top perspective view of a sixtieth apparatus in accordance with an embodiment of the present invention, with a pair of hands shown.

FIG. 68 shows an apparatus 710 including a block 711 and a pin 712. The pin 712 includes a head or cap portion 712*b*, a body portion 712*a* and a point 712*c*. The block 711 includes a slot 711*a* and a slot 711*b*. In operation, a person using their hand 650 may insert the head portion 712*b* into slot 711*a* or 711*b* of block 711 held by hand 652, so that pin body portion 712*a* is at a right angle with respect to the block 711 and point 712*c* is outside of the block 711.

Figure 69:
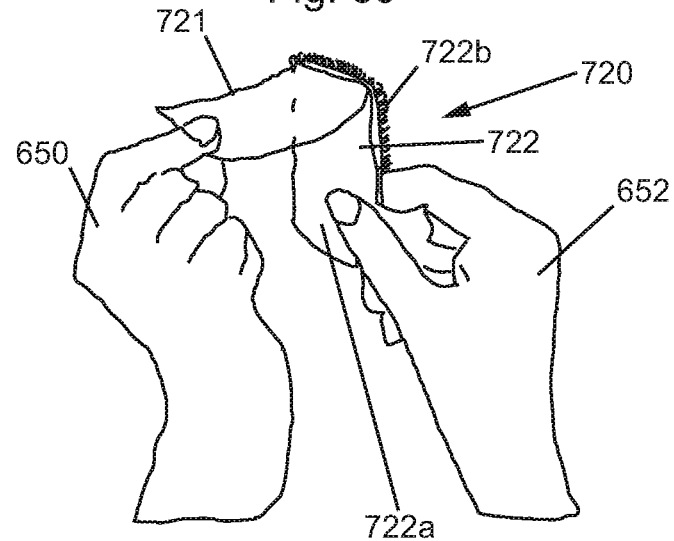
FIG. 69 shows a front, right and top perspective view of a sixty-first apparatus in accordance with an embodiment of the present invention, with the pair of hands shown.

FIG. 69 shows an apparatus 720 including portions 721 and 722. The portion 721 is held by hand 650 and the portion or strip 722 is held by hand 652. The portion 722 may be a strip which has adhesive on side 722*a* and a VELCRO (trademarked) and/or hooks and/or loops portion on the opposite side 722*b*. The portion 721 may be a cover which is peeled off to reveal the adhesive side 722*a* of strip 722.

Strip 722, after cover 721 is torn off, may be used with the apparatus 710, by puncturing the strip 722 with the point 712*c* of the pin 712 and then the adhesive portion 722*a* can be attached to the surface 711*c* of the block 711 to attach strip 722 to the apparatus 710.

Figure 70:
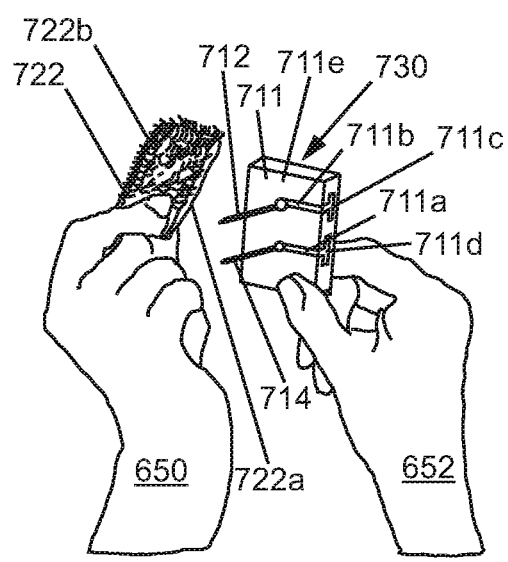
FIG. 70 shows a front, right and top perspective view of a combination sixty-second apparatus of the sixtieth apparatus, a further pin, and part of the sixty-first apparatus, in a disassembled state, in accordance with an embodiment of the present invention, with the pair of hands shown.

FIG. 70 shows an apparatus 730 including strip 722, block 711, and pins 712 and 714.

The pins 712 and 714 are connected to block 711 so that they protrude out at a ninety degree angle from block 711. Pins 712 and 714 have a head or cap portion, similar or identical to head or cap portion 712*b*, inserted in a slot or slot portion 711*c* and 711*d*, respectively, of the block 711. Pins 712 and 714 have thin body portions which project outwards and part of which are inside thin slots or slot portions 711*a* and 711*b*. The strip 722, may have adhesive surface 722*a* for attaching to surface 711*e* of block 711, and VELCRO (trademarked) hooks and/or loops surface 722*b*, and is held by hand 650. The block 711 is held by hand 652.

Figure 71:
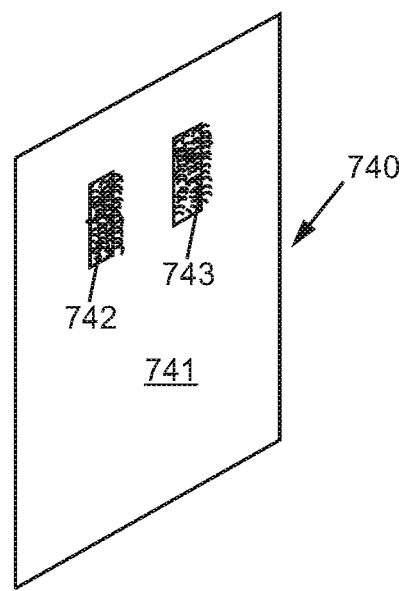
FIG. 71 shows a simplified front view of a wall and VELCRO (trademarked) and/or loops and/or hooks strips attached to the wall.

FIG. 71 shows a diagram 740 of a wall 741 and strips 742 and 743 attached to the wall 741. Each of strips 742 and 743 may be identical to strip 722 and may have an adhesive side which is attached to the wall 741 and a VELCRO (trademarked) and/or hooks and/or loops side which is showing in FIG. 71.

Figure 72:
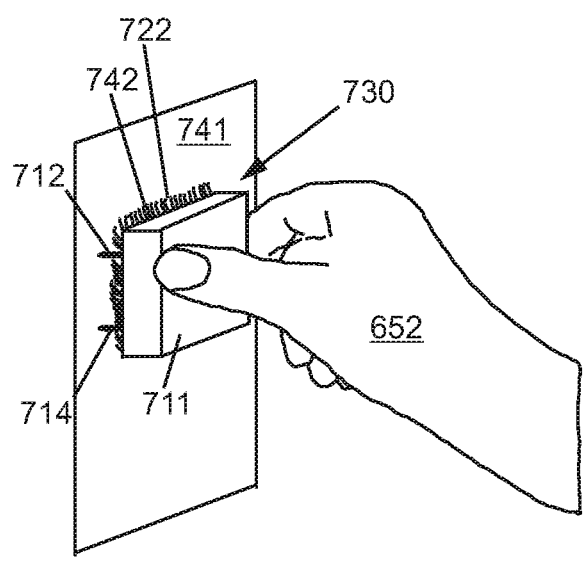
FIG. 72 shows a right, top, and rear view of the combination sixty-second apparatus of FIG. 70 in a fully assembled state during the act of inserting the combination of FIG. 70 into a wall, with one of the pair of hands.

FIG. 72 shows the apparatus 730 including pins 712 and 714, and block 711. The apparatus 730 is shown being inserted attached to wall 741. A person holds the block 711 with hand 652. The VELCRO (trademarked) and/or hooks and/or loops portion of the strip 722 is connected with a mating portion of the strip 742, and the pins 712 and 714 puncture through the strip 742 to connect the block 711 to the wall 741 by both insertion of the pins 712 and 714 and the mating of the VELCRO (trademarked) and/or hooks and/or loops portions 722 and 742.

Figure 73:
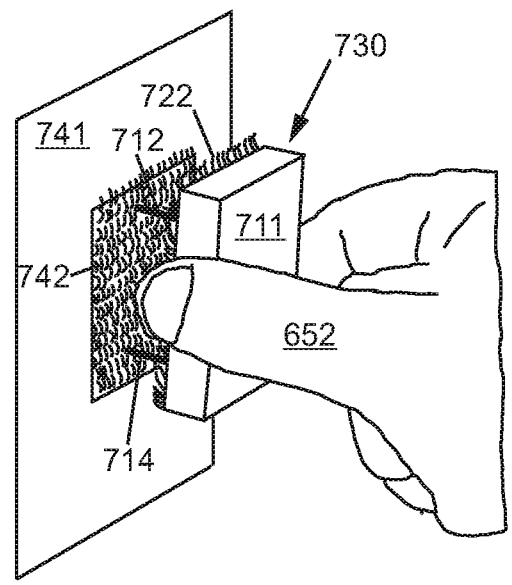
FIG. 73 shows a right, top, and rear view of the combination sixty-second apparatus of FIG. 70 in a fully assembled state during the act of taking the combination of FIG. 70 out of a wall, with one of the pair of hands.

FIG. 73 shows an apparatus 730 including pins 712 and 714, and block 711. The apparatus 730 is shown slightly removed from the wall 741. A person holds the block 711 with hand 652

All pins shown, such as pins 2, 4 of FIG. 1; 12 and 14 of FIG. 2; 22 and 24 of FIG. 3; 34 and 35 of FIG. 4A; 52 of FIG. 5; 62 and 64 of FIG. 6; 72 and 74 of FIG. 7; 82 and 84 of FIG. 8; 92 of FIG. 9; 102 of FIG. 10; 116 and 118 of FIG. 11; 126 and 128 of FIG. 13; 136 of FIG. 15; 146 and 148 of FIG. 16; 152 and 158 of FIG. 17; pins 166*a*-*g* of FIG. 18; 174 of FIG. 19; 182 of FIG. 20A; 196 of FIG. 20B; 202*a* and 202*b* of FIG. 21A; 203*a* and 203*b* of FIG. 21A; 204*a* and 204*b* of FIG. 21A; pins 206 and 207 of FIG. 21A; pins 202*a*-*b* of FIG. 21C; pins 223*a*-*b* of FIG. 22; pins 233*a*-*b* of FIG. 23; 246 of FIG. 24; 256 of FIG. 25; 266 and 268 of FIG. 26; 276 of FIG. 27; 286 of FIG. 28; 296 of FIG. 29; 306 of FIG. 30; 340 of FIG. 34; 350 of FIG. 35; 366 of FIG. 36; 373, 375, 377, and 379 of FIG. 37; 383, 385, and 387 of FIG. 38; 391, 393, and 397 of FIG. 39; 402 and 404 of FIG. 40; 411*a*-*b*, 411, 413, and 415 of FIG. 41; 435 and 434 of FIG. 43; 457-458 of FIG. 44B; 452*a*-*b*, 453*a*-*b*, 454*a*-*b*, 457-458, 459-460 of FIG. 44A; 472, 478, 479, and 483 of FIG. 45; 491, 492, 293, 494, 495, 496, and 497 of FIG. 46; 534-5 of FIG. 49; 555-556 of FIG. 51; 571 and 572 of FIG. 53; 581 and 582 of FIG. 54; 606 of FIG. 56; 611-612 of FIG. 57; 621-622 of FIG. 58; 631-632 of FIG. 59; 642 of FIG. 60; 642 and 644 of FIGS. 62-65; 712 of FIG. 68; 712 and 714 of FIGS. 70 and 72-73 may be made of a hard rigid material, such as metal, may have a large cap or head portion attached to an elongated narrow portion ending in a point. The large cap or head portion has a wider width than the elongated narrow portion which helps to retain the particular pin in a slot of a block.

All blocks shown, such as blocks 7 of FIG. 1; 17 of FIGS. 2; 21 and 27 of FIGS. 3; 32 and 31 of FIG. 4A; 56 of FIG. 5; 68 of FIG. 6; 78 of FIG. 7; 88 of FIG. 8; 96 of FIG. 9; 106 of FIG. 10; 114 of FIG. 11; 124 of FIG. 13; 134 of FIG. 14; 144 of FIG. 16; 156 of FIG. 17; 162 of FIG. 18; 176 of FIGS. 19; 183 and 184 of FIG. 20A; 194 of FIG. 20B; 202*d*, 203*c*, 204*c*, and 205 of FIG. 21A; 223*c* of FIG. 22; 233 of FIG. 23; 244 of FIG. 24; 254 of FIG. 25; 264 of FIG. 26; 274 of FIG. 27; 284 of FIG. 28; 294 of FIG. 29; 304 of FIG. 30; 314 of FIG. 31; 364 of FIG. 36; 356 of FIG. 35; 372 of FIG. 37; 384 of FIG. 38; 394 of FIG. 39; 408 of FIG. 40; 416 of FIGS. 41; 437, 433, and 438 of FIGS. 43; 452*d*, 453, 454 and 455 of FIG. 44A; 474, 475, 476, 480, and 485 of FIGS. 45; 499 and 508 of FIG. 46; 502 of FIG. 47; 521 of FIG. 48; 532 of FIG. 49; 543 of FIG. 50; 553 of FIG. 51; 563 of FIG. 52; 574 of FIG. 53; 584 of FIG. 54; 604 of FIG. 56; 614 of FIG. 57; 626 of FIG. 58; 634 of FIG. 59; 641 of FIGS. 62-65; 711 of FIGS. 68, 70, 72-73 may be solid rigid blocks, made of, for example, hard plastic, wood, metal, or any other suitable material.

All strips or plates shown, such as strips 6 of FIG. 1; 16 of FIG. 2; 23 of FIGS. 3; 33 and 37 of FIG. 4A; 76 of FIG. 7; 86 of FIG. 8; 94 of FIG. 9, 104 of FIG. 10; 112 of FIG. 11; 122 of FIG. 13; 132 of FIG. 14; 142 of FIG. 16; 154 of FIG. 17; 162 of FIG. 18; 172 of FIG. 19; 181 of FIGS. 20A; 192 and 193 of FIG. 20B; 201 of FIG. 21A; 221 and 222 of FIGS. 22; 231 and 232 of FIG. 23; 242, 252, 262, 272, 282, 292, 302 of FIGS. 24-30, respectively; 312 of FIG. 31, 324 of FIG. 32; 330 of FIG. 33; 362 of FIG. 36; 354 of FIGS. 35; 372 and 376 of FIGS. 37; 382 and 386 of FIGS. 38; 392 and 396 of FIGS. 39; 406 and 409 of FIGS. 40; 412, 414, and 418 of FIGS. 41; 436, 431, and 432 of FIGS. 43; 451 and 456 of FIG. 44A; 473, 486, 484, 477, 481, and 482 of FIGS. 45; 498 and 500 of FIG. 46; 501 of FIG. 47; 533 of FIG. 49; 554 of FIG. 51; 573 o FIG. 53; 583 of FIG. 54; 590 of FIG. 55; 602 of FIG. 56; 613 of FIG. 57; 623-625 of FIG. 58; 633 of FIG. 59; and 662 of FIGS. 61-63 may be, for example flexible light weight strips of paper, cardboard, plastic, or another material having an adhesive on both a side which attaches to a large surface of a block (as an example, side 6*d* of strip 6 covers and is attached to large surface or large side of block 7 in FIG. 1, and covers all of the surface it is attached to, in at least one embodiment), and an adhesive on the opposite side which is configured to attach to a surface of a wall.

Strip 722 shown in FIGS. 69, 70, and 72-73 has an adhesive surface on side 722*a* and VELCRO (trademarked) and/or hooks and/or loops on opposing side 722*b*. Strip 722 may be a flexible light weight strip of paper, cardboard, plastic or another material having an adhesive on one side 722*a*, which is configured to be the same size of a large surface of block 711 that it will cover, and VELCRO (trademarked) and/or hooks and/or loops on opposing side 722*b*, which his configured to be the same size and to be able to mate with and to attach to VELCRO (trademarked) and/or hooks and/or loops portion 742 shown in FIG. 73.

All pins, block, and strips previously referred to above, may be produced, in at least one embodiment, by injection molding.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a first block;
   a first strip having a first side with a first attachment device and an opposing second side with an adhesive; and
   a first pin having an elongated portion, the elongated portion having a first end and an opposing second end at which there is a point; and
   wherein the first end of the elongated portion of the first pin resides within the first block in a first state;
   wherein the elongated portion of the first pin projects from the first block in the first state;
   wherein the first side of the first strip is configured to be attached to the first block by the first attachment device and the elongated portion of the first pin projects out through a first opening in the first strip, when the first strip is attached to the first block and the first pin is attached to the first block in the first state; and
   wherein the apparatus is configured to be attached to a wall by the adhesive of the opposing second side of the first strip being adhered to the wall and at the same time by at least part of the elongated portion of the first pin being inserted into the wall in the first state.

2. The apparatus of claim 1 wherein
   the first pin has a head portion, wherein the elongated portion is connected at the first end of the elongated portion to the head portion, and the elongated portion projects from the head portion to the opposing second end of the elongated portion;
   wherein the head portion of the first pin is configured to be attached to the first block in the first state, so that the head portion of the first pin is entirely within a first opening in the first block and the elongated portion of the first pin projects from the first block in the first state; and
   wherein the first side of the first strip is configured to be attached to the first block by the first attachment device and the elongated portion of the first pin projects out through a first opening in the first strip and the head portion of the first pin does not contact the first strip, when the first strip is attached to the first block and the first pin is attached to the first block in the first state.

3. The apparatus of claim 2 further comprising
   a second pin having a head portion and an elongated portion which is connected at a first end to the head portion, projects from the head portion of the second pin, and has an opposing second end at which there is a point; and
   wherein the head portion of the second pin is configured to be attached to the first block in the first state, so that the head portion of the second pin is entirely within a second opening in the first block and the elongated portion of the second pin projects from the first block in the first state; and
   wherein the first side of the first strip is configured to be attached by the first attachment device to the first block and the elongated portion of the second pin projects out through a second opening in the first strip and the head portion of the second pin does not contact the first strip, when the first strip is attached to the first block and the second pin is attached to the first block in the first state.

4. The apparatus of claim 3 wherein
the elongated portion of the first pin projects out at a ninety degree angle with respect to the first block in the first state; and
the elongated portion of the second pin projects out at a ninety degree angle with respect to the first block in the first state.

5. The apparatus of claim 3 wherein
the first opening in the first block is a first slot, into which the head portion of the first pin is configured to be inserted in order to attach the head portion of the first pin to the first block;
wherein the second opening in the first block is a second slot, into which the head portion of the second pin is configured to be inserted in order to attach the head portion of the second pin to the first block.

6. The apparatus of claim 5 wherein
the first slot is substantially perpendicular to the second slot.

7. The apparatus of claim 2 wherein
the first side of the first strip is approximately equal to a side of the first block to which the first side of the first strip is configured to be attached.

8. The apparatus of claim 2 wherein
the first side of the first strip is substantially larger than a side of the first block to which the first side of the first strip is configured to be attached, so that part of the first side of the first strip extends beyond the first block, while substantially an entire side of the first block is covered with part of the first side of the first strip.

9. The apparatus of claim 2 further comprising
a second block,
wherein the first opening of the first block is a first slot; and
wherein the second block has a protruding portion which is configured to be inserted into the first slot of the first block to attach the second block onto the first block.

10. The apparatus of claim 2 wherein
the first opening in the first block is a first slot, into which the head portion of the first pin is configured to be inserted in order to attach the head portion of the first pin to the first block.

11. The apparatus of claim 2 wherein
the elongated portion of the first pin projects out at a ninety degree angle with respect to the first block in the first state.

12. The apparatus of claim 1 wherein
the first attachment device is an adhesive.

13. The apparatus of claim 1 wherein
the first attachment device is comprised of hooks or loops.

14. An apparatus comprising:
a first block;
a first strip having a first side with a first attachment device and an opposing second side with an adhesive; and
a first pin having a head portion and an elongated portion which is connected at a first end to the head portion, projects from the head portion of the first pin, and has an opposing second end at which there is a point; and
wherein the head portion of the first pin is configured to be attached to the first block in a first state, so that the elongated portion of the first pin projects from the first block in the first state;
wherein the first side of the first strip is configured to be attached to the first block by the first attachment device and the elongated portion of the first pin projects out through a first opening in the first strip, when the first strip is attached to the first block and the first pin is attached to the first block; and
wherein
the first block includes a first slot, into which the head portion of the first pin is configured to be inserted in order to attach the head portion of the first pin to the first block.

15. A method comprising the steps of:
attaching an apparatus to a wall;
wherein the apparatus is comprised of:
a first block;
a first strip having a first side with a first attachment device and an opposing second side with an adhesive; and
a first pin having an elongated portion, the elongated portion having a first end and an opposing second end at which there is a point;
wherein the first end of the elongated portion of the first pin resides within the first block in a first state;
wherein the elongated portion of the first pin projects from the first block in the first state; and
wherein the first side of the first strip is configured to be attached to the first block by the first attachment device and the elongated portion of the first pin projects out through a first opening in the first strip, when the first strip is attached to the first block and the first pin is attached to the first block in the first state; and
wherein the apparatus is configured to be attached to a wall by the adhesive of the opposing second side of the first strip being adhered to the wall and at the same time by at least part of the elongated portion being inserted into the wall in the first state.

16. The method of claim 15 further comprising
detaching the apparatus from the wall.

17. The method of claim 15 wherein
the first pin has a head portion, wherein the elongated portion is connected at the first end of the elongated portion to the head portion, and the elongated portion projects from the head portion to the opposing second end of the elongated portion;
wherein the head portion of the first pin is configured to be attached to the first block in the first state, so that the head portion of the first pin is entirely within a first opening in the first block and the elongated portion of the first pin projects from the first block in the first state; and
wherein the first side of the first strip is configured to be attached to the first block by the first attachment device and the elongated portion of the first pin projects out through a first opening in the first strip and the head portion of the first pin does not contact the first strip, when the first strip is attached to the first block and the first pin is attached to the first block in the first state.

18. The method of claim 17 wherein
the apparatus further includes a second pin having a head portion and an elongated portion which is connected at a first end to the head portion, projects from the head portion of the second pin, and has an opposing second end at which there is a point; and
wherein the head portion of the second pin is configured to be attached to the first block in the first state, so that the head portion of the second pin is entirely within a second opening in the first block and the elongated portion of the second pin projects from the first block in the first state; and
wherein the first side of the first strip is configured to be attached by the first attachment device to the first block and the elongated portion of the second pin projects out through a second opening in the first strip and the head portion of the first pin does not contact the first strip, when the first strip is attached to the first block and the second pin is attached to the first block in the first state.

19. The method of claim 18 wherein
the elongated portion of the first pin projects out at a ninety degree angle with respect to the first block in the first state; and
the elongated portion of the second pin projects out at a ninety degree angle with respect to the first block in the first state.

20. The method of claim 18 wherein
the first opening of the first block is a first slot, into which the head portion of the first pin is configured to be inserted in order to attach the head portion of the first pin to the first block;
wherein the second opening of the first block is a second slot, into which the head portion of the second pin is configured to be inserted in order to attach the head portion of the second pin to the first block.

21. The method of claim 20 wherein
the first slot is substantially perpendicular to the second slot.

22. The method of claim 17 wherein
the first side of the first strip is approximately equal to a side of the first block to which the first side of the first strip is configured to be attached.

23. The method of claim 17 wherein
the first side of the first strip is substantially larger than a side of the first block to which the first side of the first strip is configured to be attached, so that part of the first side of the first strip extends beyond the first block, while substantially an entire side of the first block is covered with part of the first side of the first strip.

24. The method of claim 17 further comprising
a second block,
wherein the first block has a first slot; and
wherein the second block has a protruding portion which is configured to be inserted into the first slot of the first block to attach the second block onto the first block.

25. The method of claim 17 wherein
the first opening in the first block is a first slot, into which the head portion of the first pin is configured to be inserted in order to attach the head portion of the first pin to the first block.

26. The method of claim 15 wherein
the first attachment device is an adhesive.

27. The method of claim 15 wherein
the first attachment device is comprised of hooks or loops.

28. The method of claim 17 wherein
the elongated portion of the first pin projects out at a ninety degree angle with respect to the first block in the first state.

29. A method comprising the steps of:
attaching an apparatus to a wall;
wherein the apparatus is comprised of:
  a first block;
  a first strip having a first side with a first attachment device and an opposing second side with an adhesive; and
  a first pin having a head portion and an elongated portion which is connected at a first end to the head portion, projects from the head portion of the first pin, and has an opposing second end at which there is a point; and
wherein the head portion of the first pin is configured to be attached to the first block in a first state, so that the elongated portion of the first pin projects from the first block in the first state;
wherein the first side of the first strip is configured to be attached to the first block by the first attachment device and the elongated portion of the first pin projects out through a first opening in the first strip, when the first strip is attached to the first block and the first pin is attached to the first block; and
wherein
the first block includes a first slot, into which the head portion of the first pin is configured to be inserted in order to attach the head portion of the first pin to the first block.

30. The method of claim 29 wherein
the apparatus further includes a second pin having a head portion and an elongated portion which is connected at a first end to the head portion, projects from the head portion of the second pin, and has an opposing second end at which there is a point; and
wherein the head portion of the second pin is configured to be attached to the first block in the first state, so that the elongated portion of the second pin projects from the first block in the first state;
wherein the first side of the first strip is configured to be attached by the first attachment device to the first block and the elongated portion of the second pin projects out through a second opening in the first strip, when the first strip is attached to the first block and the second pin is attached to the first block;
wherein
the first block includes a second slot, into which the head portion of the second pin is configured to be inserted in order to attach the head portion of the second pin to the first block.

31. The method of claim 30 wherein
the first slot is substantially perpendicular to the second slot.

\* \* \* \* \*